(12) United States Patent
Owens et al.

(10) Patent No.: US 10,209,747 B2
(45) Date of Patent: Feb. 19, 2019

(54) SECURITY LATCHING MECHANISM FOR TOUCH SCREEN CONTROL DEVICE WITH SPEAKERS

(71) Applicant: Crestron Electronics, Inc., Rockleigh, NJ (US)

(72) Inventors: Wayne Owens, Pearl River, NY (US); Paul Chapman, Lutz, FL (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/825,488

(22) Filed: Nov. 29, 2017

(65) Prior Publication Data

US 2018/0081403 A1    Mar. 22, 2018

Related U.S. Application Data

(63) Continuation-in-part of application No. 15/183,874, filed on Jun. 16, 2016.
(Continued)

(51) Int. Cl.
| | |
|---|---|
| *G06F 1/16* | (2006.01) |
| *E05B 65/00* | (2006.01) |
| *G06F 3/041* | (2006.01) |
| *H04R 1/02* | (2006.01) |
| *H04R 5/02* | (2006.01) |

(52) U.S. Cl.
CPC ........ *G06F 1/1679* (2013.01); *E05B 65/0067* (2013.01); *G06F 1/1632* (2013.01); *G06F 3/041* (2013.01); *G06F 1/1626* (2013.01); *H04R 1/028* (2013.01); *H04R 5/02* (2013.01); *H04R 2499/15* (2013.01)

(58) Field of Classification Search
CPC .... G06F 1/1679; G06F 1/1632; G06F 1/1626; G06F 3/041; E05B 65/0067; H04R 1/028; H04R 5/02; H04R 2499/15
See application file for complete search history.

(56) References Cited

U.S. PATENT DOCUMENTS

| | | | |
|---|---|---|---|
| 2012/0250232 A1* | 10/2012 | Li | F16M 11/041 361/679.01 |
| 2012/0250233 A1* | 10/2012 | Lee | F16M 11/10 361/679.01 |

(Continued)

*Primary Examiner* — Regina N Holder
(74) *Attorney, Agent, or Firm* — Crestron Electronics, Inc.

(57) ABSTRACT

A security latching mechanism attached to a first device for removably securing the first device to a second device is provided, comprising an upper latching plate, a lower latching plate, and a base plate adapted to retain the upper latching plate and the lower latching in a sliding cooperative engagement with respect to each other and the base plate, and wherein each of the upper and lower latching plates further comprise a latch portion adapted to cause a sliding movement for its respective latching plate from a first position to a second position when the respective latching portions are in sliding contact with a security latching mechanism receptacle in the second device, such that the security latching mechanism can pass through the security latching mechanism receptacle when the second position has been reached by each of the upper and lower latching plate, and upon passing through the security latching mechanism receptacle, each of the upper latching plate and lower latching plate returns to the first position.

11 Claims, 22 Drawing Sheets

Related U.S. Application Data

(60) Provisional application No. 62/180,123, filed on Jun. 16, 2015.

(56) References Cited

U.S. PATENT DOCUMENTS

| | | | |
|---|---|---|---|
| 2013/0044411 A1* | 2/2013 | Zhen | F16M 11/041 361/679.01 |
| 2015/0097102 A1* | 4/2015 | Cassidy | A47B 85/00 248/558 |

\* cited by examiner

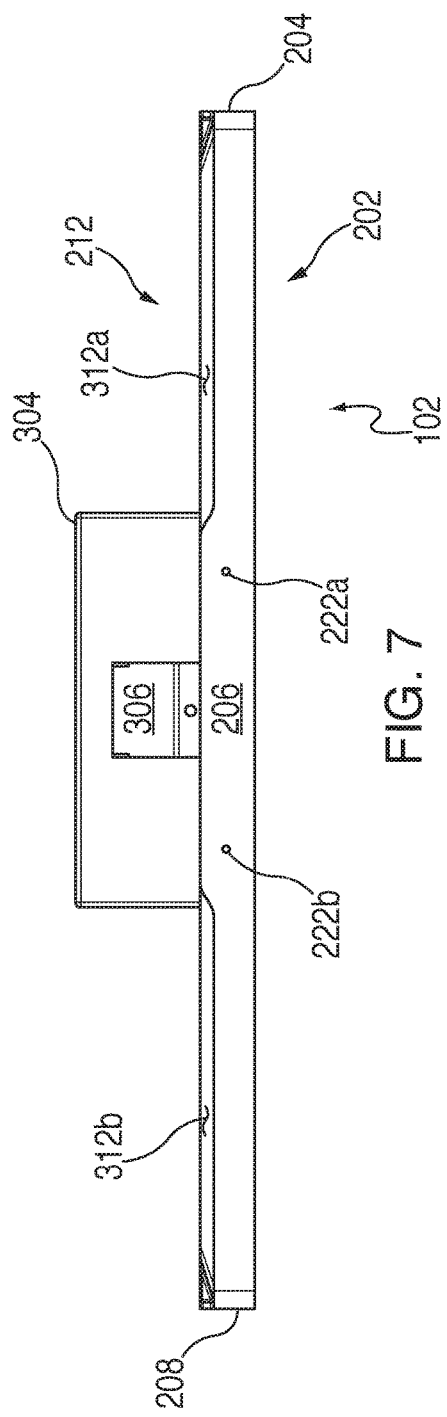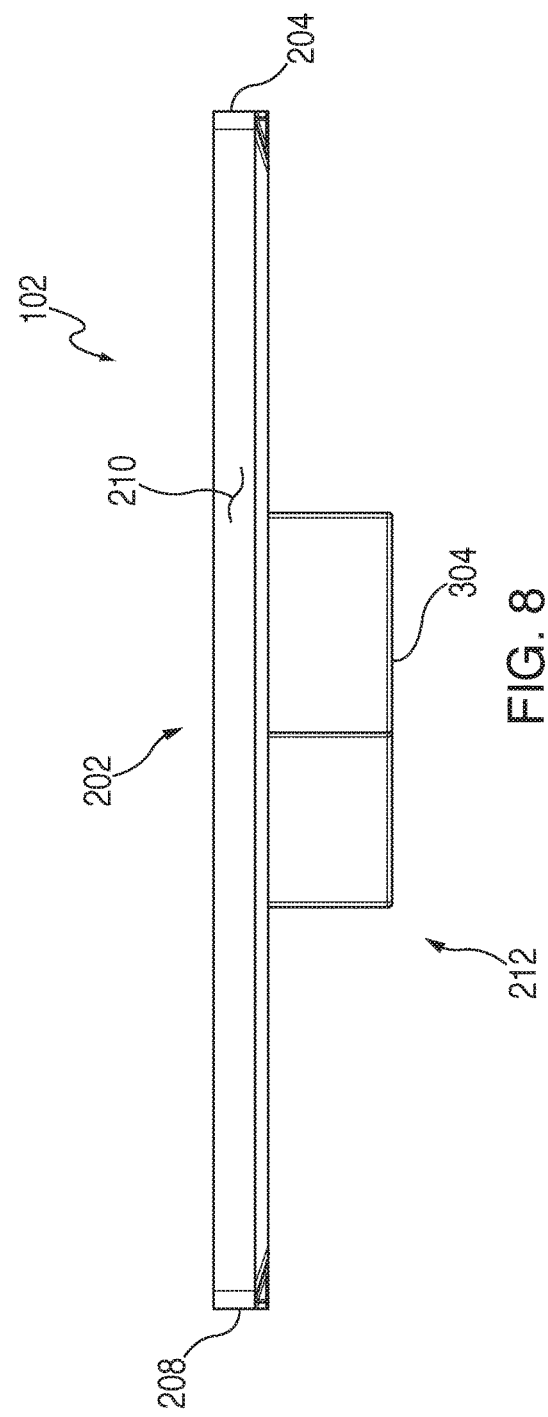

SECURITY LATCHING MECHANISM FOR TOUCH SCREEN CONTROL DEVICE WITH SPEAKERS

PRIORITY INFORMATION

The present application claims priority under 35 U.S.C. § 119(e) to U.S. Provisional Patent Application Ser. No. 62/180,123, filed 16 Jun. 2015, and under 35 U.S.C. § 120 to U.S. Non-Provisional Patent Application No. 15/183,874, filed 16 Jun. 2016, as a Continuation in Part Application, the entire contents of both of which are expressly incorporated herein by reference.

BACKGROUND

Technical Field

Aspects of the embodiments relate generally to touch screens that can be used to control different automated systems in both commercial and residential environments, and more specifically to systems, methods, and modes for a touch screen control device that has integrated within it one or more speakers, but yet which maintains a substantially thin mounting profile.

Background Art

Other wall mounted touch screen control devices exhibit a protruding profile due to placement of speakers. Such devices are unsightly and can be obtrusive.

Accordingly, a need has arisen for systems, methods, and modes for a touch screen control device that has integrated within it one or more speakers, but yet which maintains a substantially thin mounting profile.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for a touch screen control device that has integrated within it one or more speakers, but yet which maintains a substantially thin mounting profile that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to an aspect of the embodiments, a substantially slim, unobtrusive wall mounted touch screen control device is provided comprising a touch screen interactive display, a plurality of hard buttons arranged in a substantially vertical manner, one or more integrated side-wall mounted speakers, and a chamfered side wall.

According to aspects of the embodiments, a controller for use in controlling one or more controllable devices is provided, comprising: a cubic enclosure, the cubic enclosure including a front surface that is a substantially flat planar surface, a left and right side, a top and bottom side, and a rear surface; an interactive display panel disposed on the front surface of the controller, wherein the front surface is adapted to provide access to the display panel; a circuitry enclosure attached to the rear surface of the controller, the circuitry enclosure adapted to enclose controller circuitry, and is further adapted to interface with a junction box located in the wall, such that the controller is removably attachable to the junction box; and a plurality of chamfered surfaces formed on the rear surface, the chamfered surfaces adapted to provide a removing function for the controller, when it is desired to remove the controller from the junction box.

According to the first aspect of the embodiments, each of the plurality of chamfered surfaces comprises an angled surface that is formed at an angle of about 18° from the rear surface.

According to the first aspect of the embodiments, each of the plurality of chamfered surfaces comprises an angled surface that is formed at an angle that ranges from about 10° to about 26° from the rear surface.

According to the first aspect of the embodiments, the ratio of width of the controller to the depth of the controller is about 12.07, and wherein the ratio of height of the controller to the depth of the controller is about 7.80.

According to the first aspect of the embodiments, the ratio of width of the controller to the depth of the controller is about 16.21, and wherein the ratio of height of the controller to the depth of the controller is about 10.12.

According to the first aspect of the embodiments, the ratio of width of the controller to the depth of the controller is about 21.61, and wherein the ratio of height of the controller to the depth of the controller is about 13.78.

According to the first aspect of the embodiments, the controller further comprises a mounting bracket adapted to provide a mounting surface to the controller, and wherein the mounting bracket is adapted to interface with both the circuitry enclosure and the junction box.

According to the first aspect of the embodiments, the mounting bracket comprises: a substantially planar portion adapted to interface with, and mount to, the junction box; and a three dimensional cubic portion of substantially similar size and dimension to the circuitry enclosure such that the circuitry enclosure fits in a removably attachable manner to the three dimensional cubic portion.

According to the first aspect of the embodiments, the mounting bracket comprises: a plurality of substantially planar surfaces orthogonal to the substantially planar portion, wherein each of the substantially planar surfaces orthogonal to the substantially planar portion comprises a spring loaded dimple mount, each of the plurality of spring loaded dimple mounts including a dimpled protrusion, and each of the plurality of dimpled protrusions is adapted to fit within a respective one of a dimpled recess located on a corresponding surface of the circuitry enclosure, such that an interaction between each of the dimpled protrusions within the dimpled recesses causes the controller to be retained to the mounting bracket that is attached to the junction box.

According to the first aspect of the embodiments, the chamfered surfaces provide access to a device to pry the controller out of and away from the junction box.

According to the first aspect of the embodiments, each of the chamfered surfaces is adapted to be used by one or more fingers of a user to remove the controller from the junction box.

According to the first aspect of the embodiments, the controller further comprises one or more speakers, each of the one or more speakers located on either or both of a right side and left side of the controller, and wherein each of the one or more speakers comprises a long axis and a short axis, and further wherein the long axis of the speaker is substantially parallel to each of the left and right sides of the controller.

According to a second aspect of the embodiments, a security latching mechanism attached to a first device for removably securing the first device to a second device is provided, comprising: an upper latching plate; a lower latching plate; and a base plate adapted to retain the upper latching plate and the lower latching in a sliding cooperative engagement with respect to each other and the base plate, and wherein each of the upper and lower latching plates further comprise a latch portion adapted to cause a sliding movement for its respective latching plate from a first position to a second position when the respective latching portions are in sliding contact with a security latching mechanism receptacle in the second device, such that the security latching mechanism can pass through the security latching mechanism receptacle when the second position has been reached by each of the upper and lower latching plate, and upon passing through the security latching mechanism receptacle, each of the upper latching plate and lower latching plate returns to the first position.

According to the second aspect of the embodiments, the latches comprise a triangular shaped portion of respective upper and lower latching plates, the triangular shaped portion comprising a linearly sloped surface and a horizontal surface, and wherein each of the linearly sloped surfaces engages in a sliding manner with the security latching mechanism receptacle to cause movement of its respective upper and lower latching plate from the first position to the second position, and further wherein when the second position is reached, each respective horizontal surface contacts a surface of the security latching mechanism receptacle to latch the security latching mechanism and the first device to the second device.

According to the second aspect of the embodiments, the latch comprises: an irregular shaped portion of respective upper and lower latching plates, the irregular shaped portion comprising a non-linearly sloped surface and a horizontal surface, and wherein each of the non-linearly sloped surfaces engages in a sliding manner with the security latching mechanism receptacle to cause movement of its respective upper and lower latching plate from the first position to the second position, and further wherein when the second position is reached, each respective horizontal surface contacts a surface of the security latching mechanism receptacle to latch the security latching mechanism and the first device to the second device.

According to the second aspect of the embodiments, the security latching mechanism further comprises a de-latching mechanism adapted to temporarily return the upper and lower latching plates from the first position to the second position such that the security latching mechanism can be retracted through the security latching mechanism receptacle.

According to the second aspect of the embodiments, the de-latching mechanism comprises: a slot shaped aperture formed when a first aperture in the upper latching plate overlaps a second aperture in the lower latching plate.

According to the second aspect of the embodiments, the first aperture in the upper latching plate is a "D" shaped aperture, and the second aperture in the lower latching pate is a horizontally flipped "D" shaped aperture, such that when the first aperture is located on top of the second aperture, the slot shaped aperture is formed by the intersection of the "D" shape and the horizontally flipped "D" shape.

According to the second aspect of the embodiments, the de-latching aperture is adapted to be operated by inserting a slot shaped tool therein, and rotating the slot shaped tool by about 90° to cause each of the upper latching plate and the lower latching plate to slide from the first position to the second position.

According to the second aspect of the embodiments, the security latching mechanism further comprises a first position restoration assembly adapted to return each of the upper latching plate and lower latching plate returns to the first position upon passage of the security latching mechanism through the security latching mechanism receptacle.

According to the second aspect of the embodiments, the first position restoration assembly comprises: a spring; a first aperture in the base plate; a second aperture in the lower latching plate, the second aperture comprising a first spring retention pin at a first end of the second aperture; and a third aperture in the upper latching plate, the third aperture comprising a second spring retention pin at a second end of the third aperture, and wherein the first, second, and third apertures are substantially similarly shaped as elongated ovals, and are substantially similar in size, and are substantially aligned with each other, such that the spring can fit within the first, second, and third apertures, and further wherein the first and second spring retention pins, located opposite each other, retain the spring within the first, second, and third apertures, and still further wherein, the size of the first, second, and third apertures, and the size and spring constant of the spring, are such that the upper and lower latching plates are pushed apart from each other by the normally compressed spring.

According to the second aspect of the embodiments, the security latching mechanism further comprises a securing screw adapted to be retained and usable by the security latching mechanism through interaction of the upper latching plate, the lower latching plate and the spring, and wherein the securing screw is adapted to secure the security latching mechanism to the first device.

According to the second aspect of the embodiments, the security latching mechanism can be pre-assembled prior to installation onto the first device, and retain being assembled following removal from the first device.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
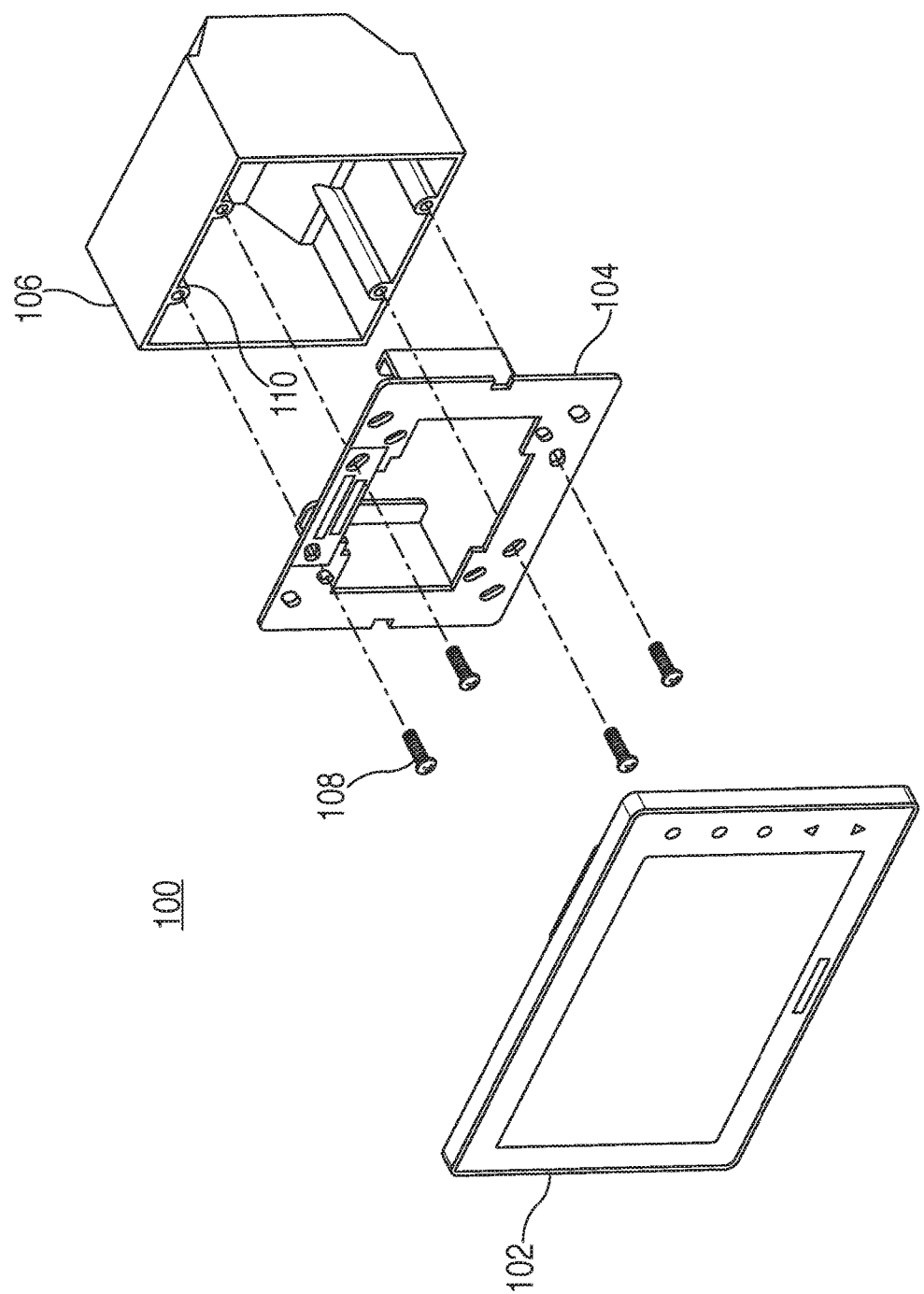

FIG. 1 illustrates a front isometric view of a wall mounted touch screen control device assembly according to aspects of the embodiments.

Figure 2:
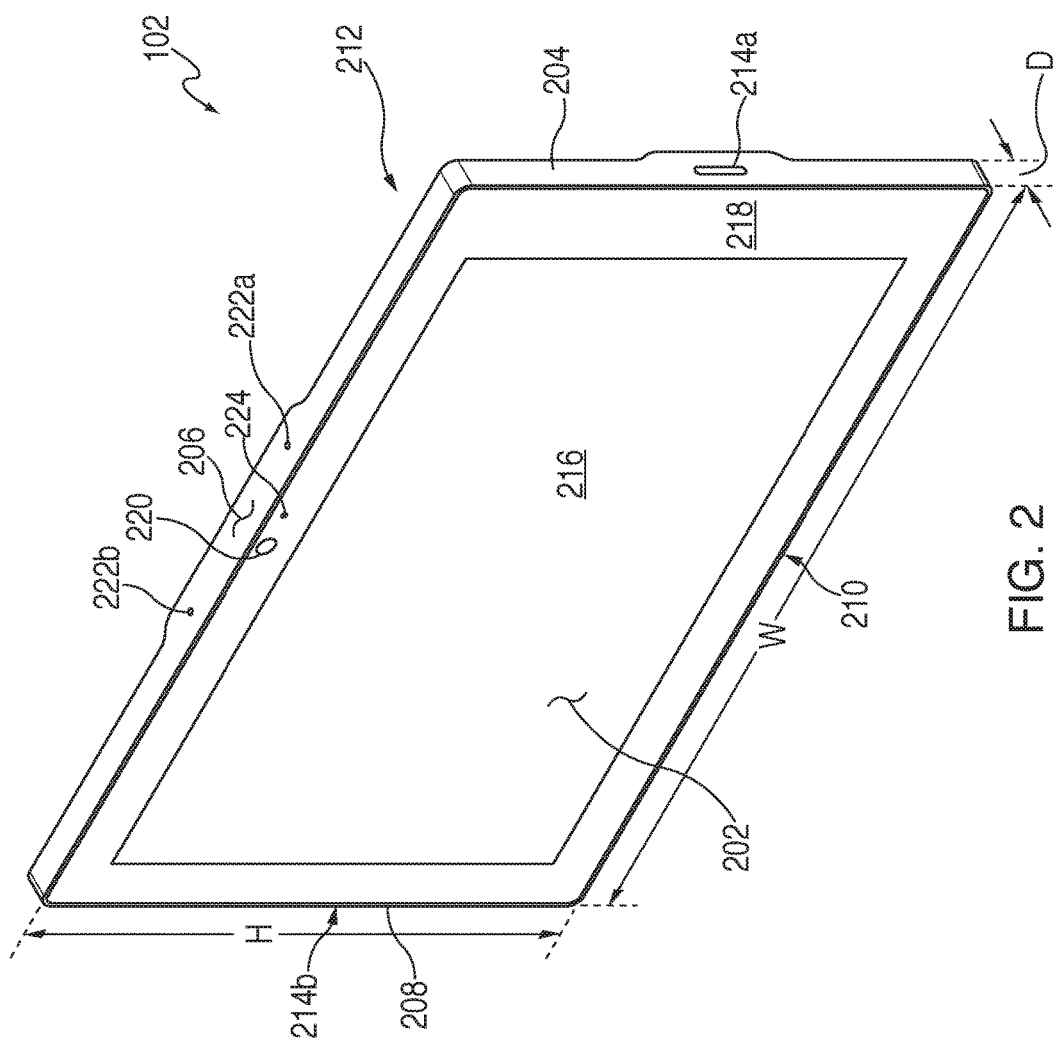

FIG. 2 illustrates a front isometric view of a wall mounted touch screen control device with integrated speakers according to aspects of the embodiments.

Figure 3:
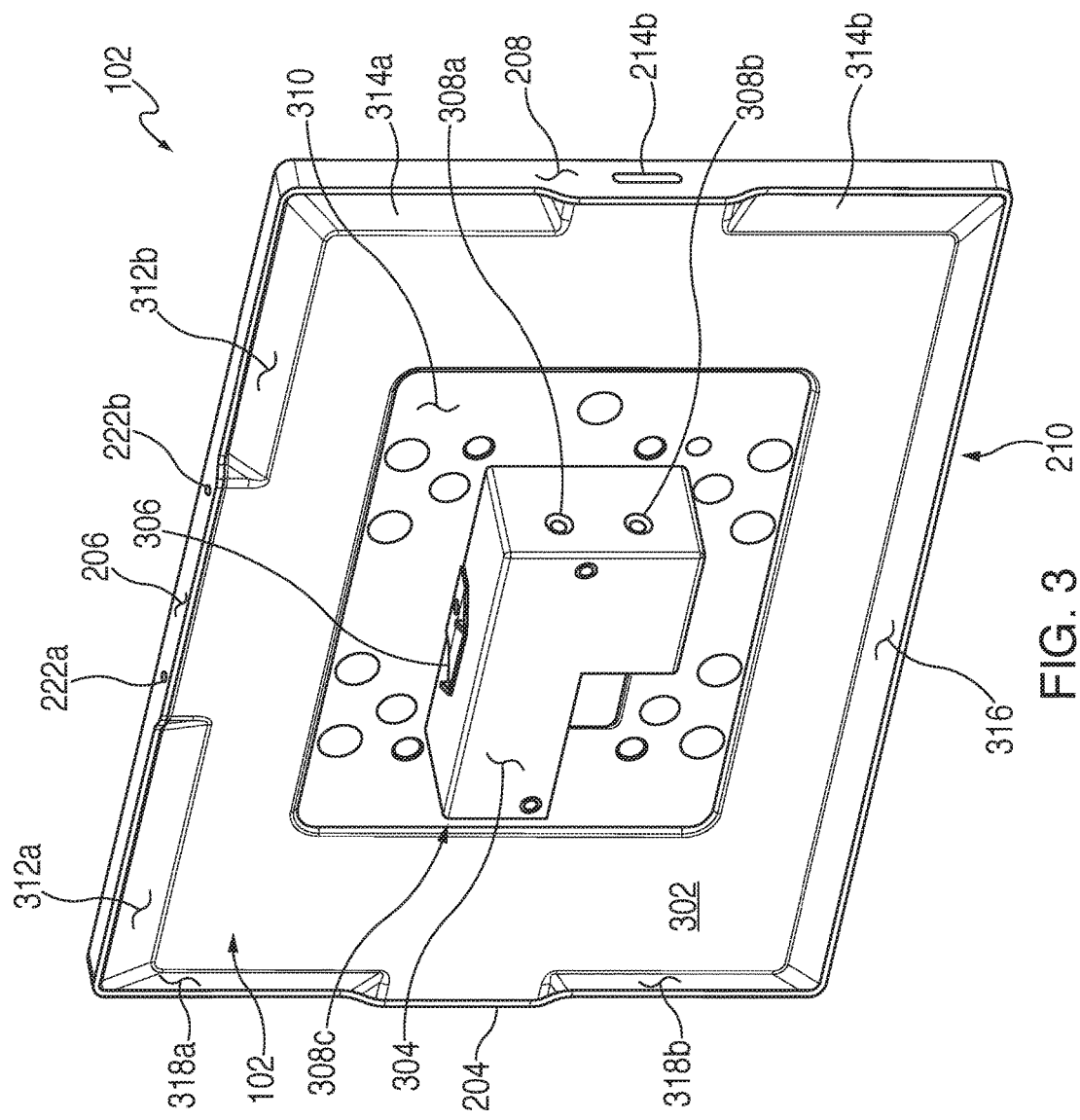

FIG. 3 illustrates a left side rear isometric view of the wall mounted touch screen control device of FIG. 1.

Figure 4:
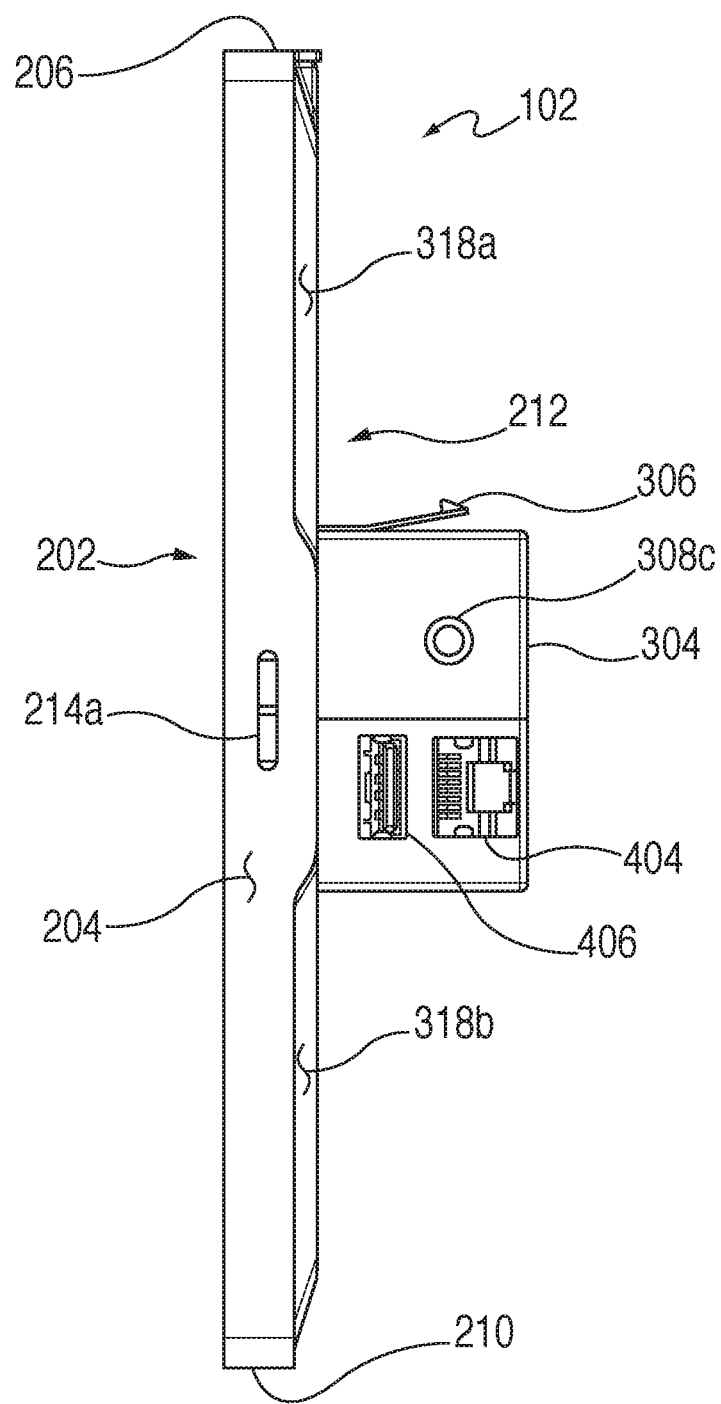

FIG. 4 illustrates a right side view of the wall mounted touch screen control device of FIG. 1.

Figure 5:
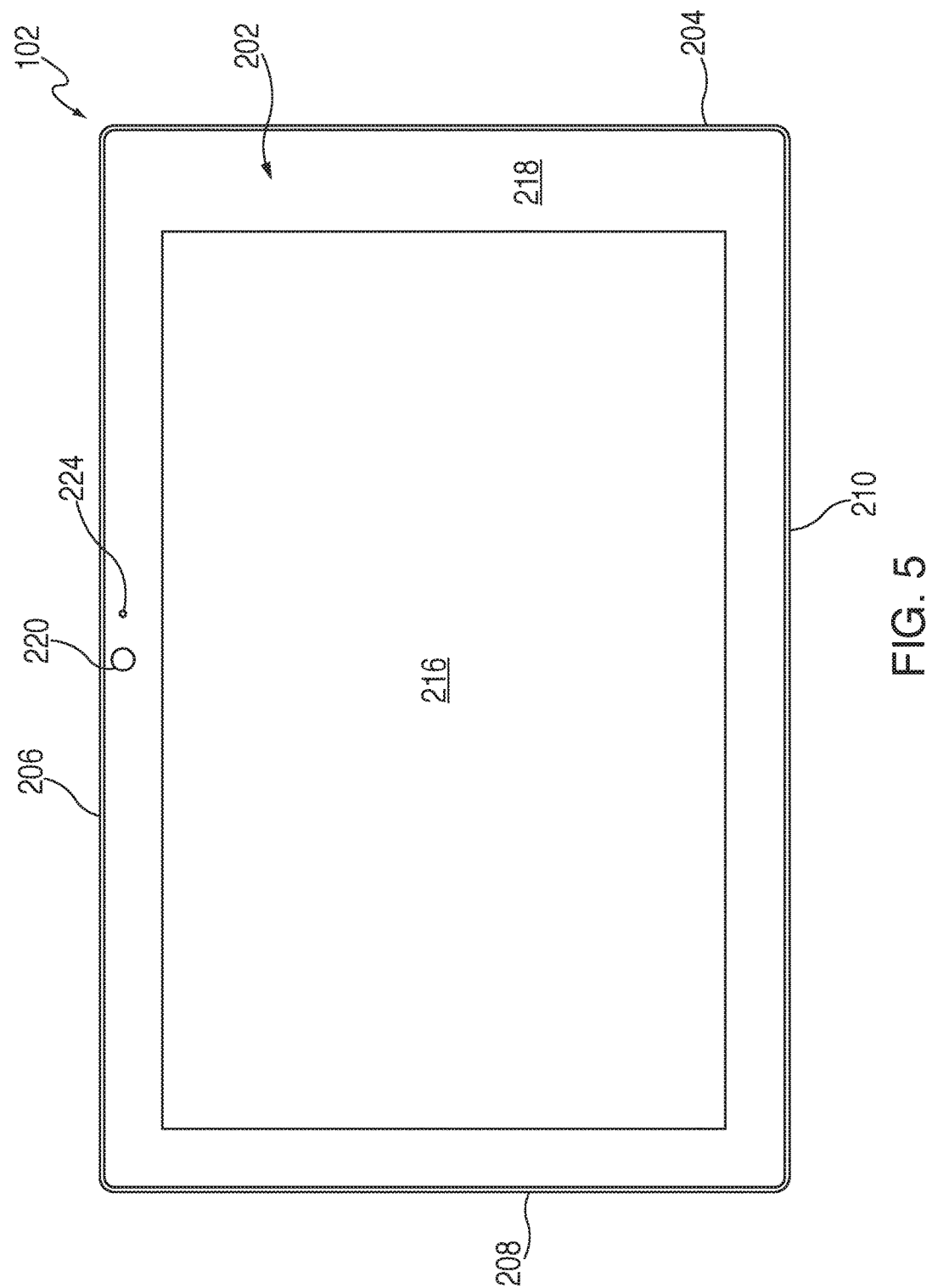

FIG. 5 illustrates a front view of the wall mounted touch screen control device of FIG. 1.

Figure 6:
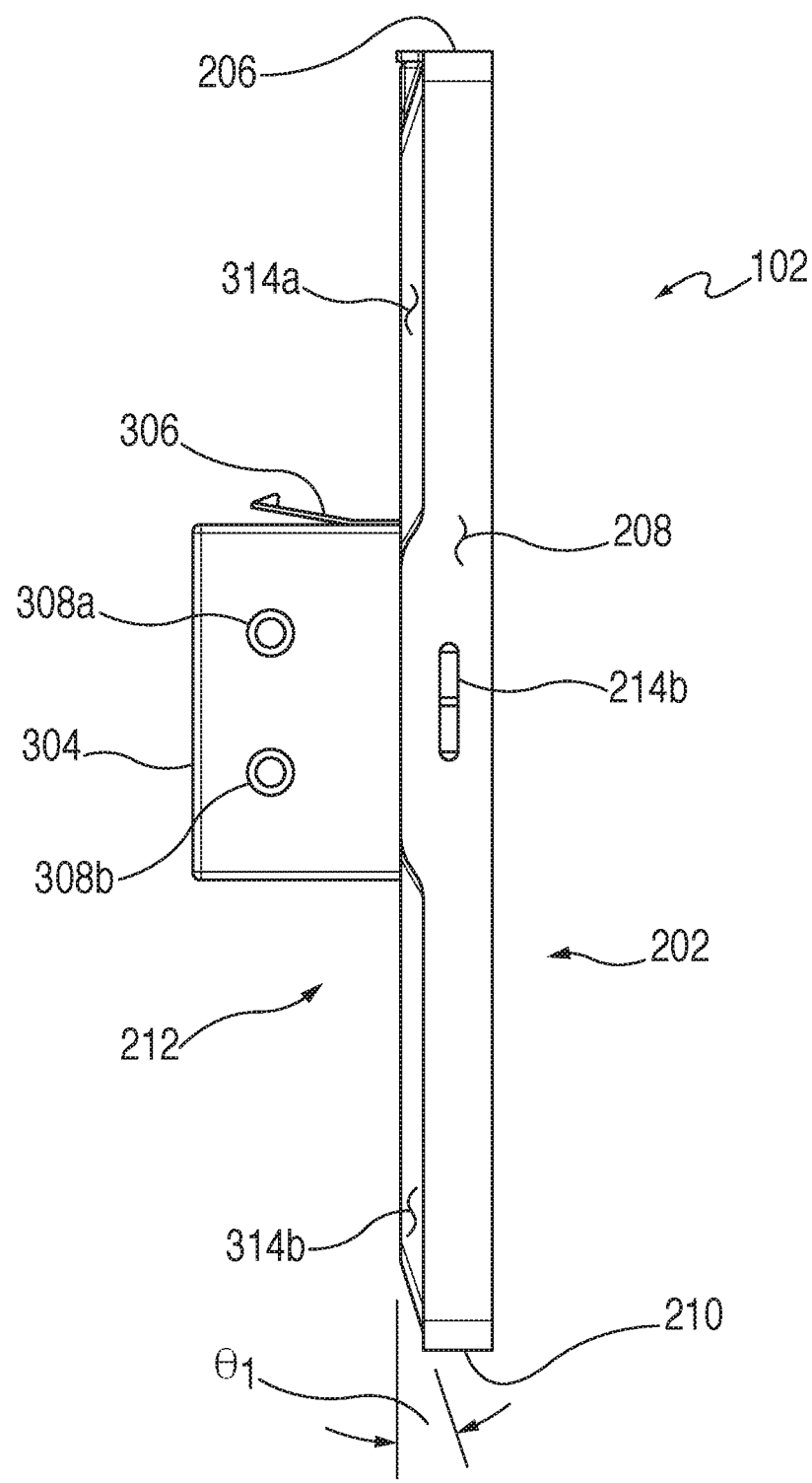

FIG. 6 illustrates a left side view of the wall mounted touch screen control device of FIG. 1.

FIG. 7 illustrates a top view of the wall mounted touch screen control device of FIG. 1.

FIG. 8 illustrates a bottom view of the wall mounted touch screen control device of FIG. 1.

Figure 9:
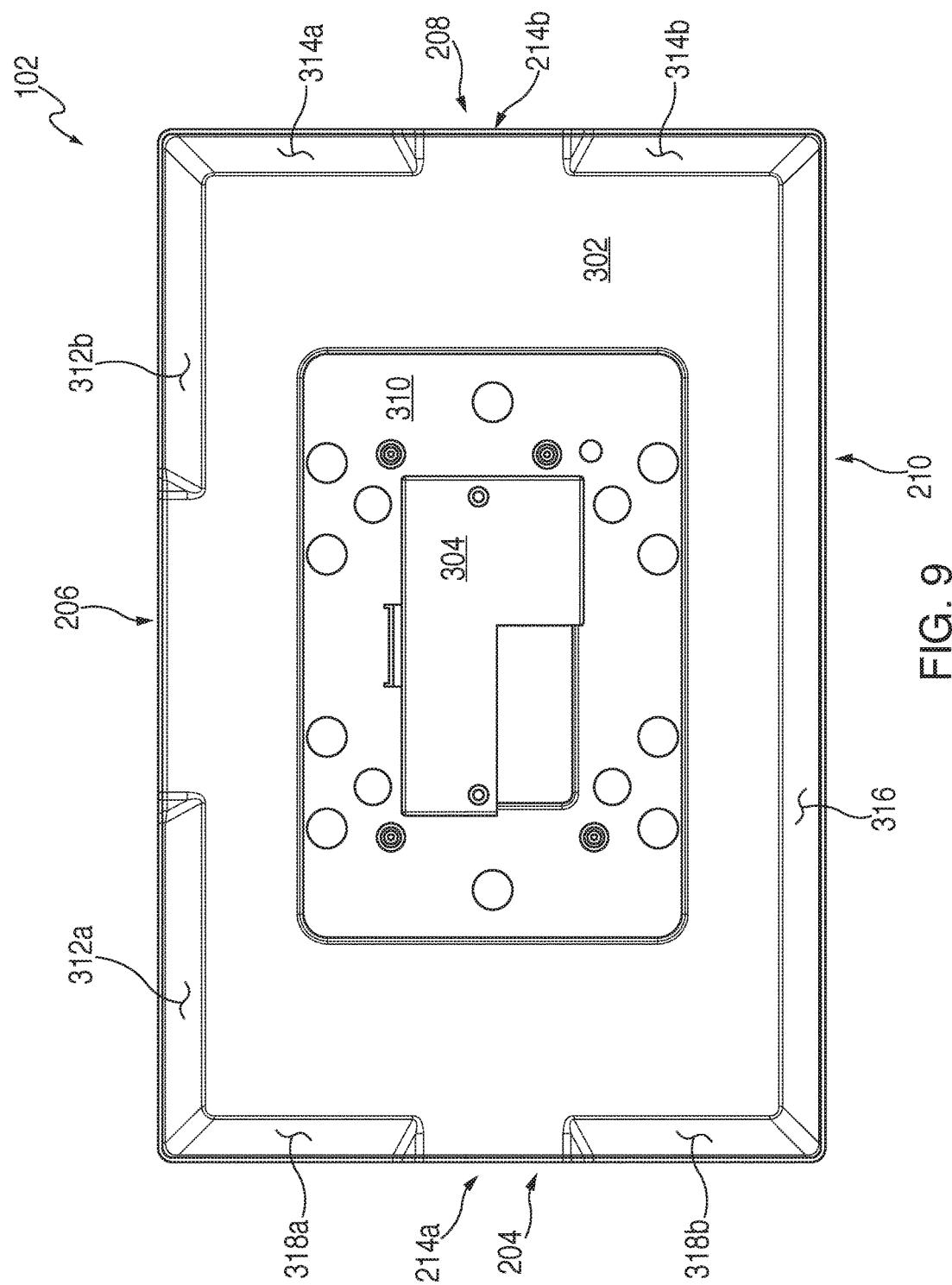

FIG. 9 illustrates a rear view of the wall mounted touch screen control device of FIG. 1.

Figure 10:
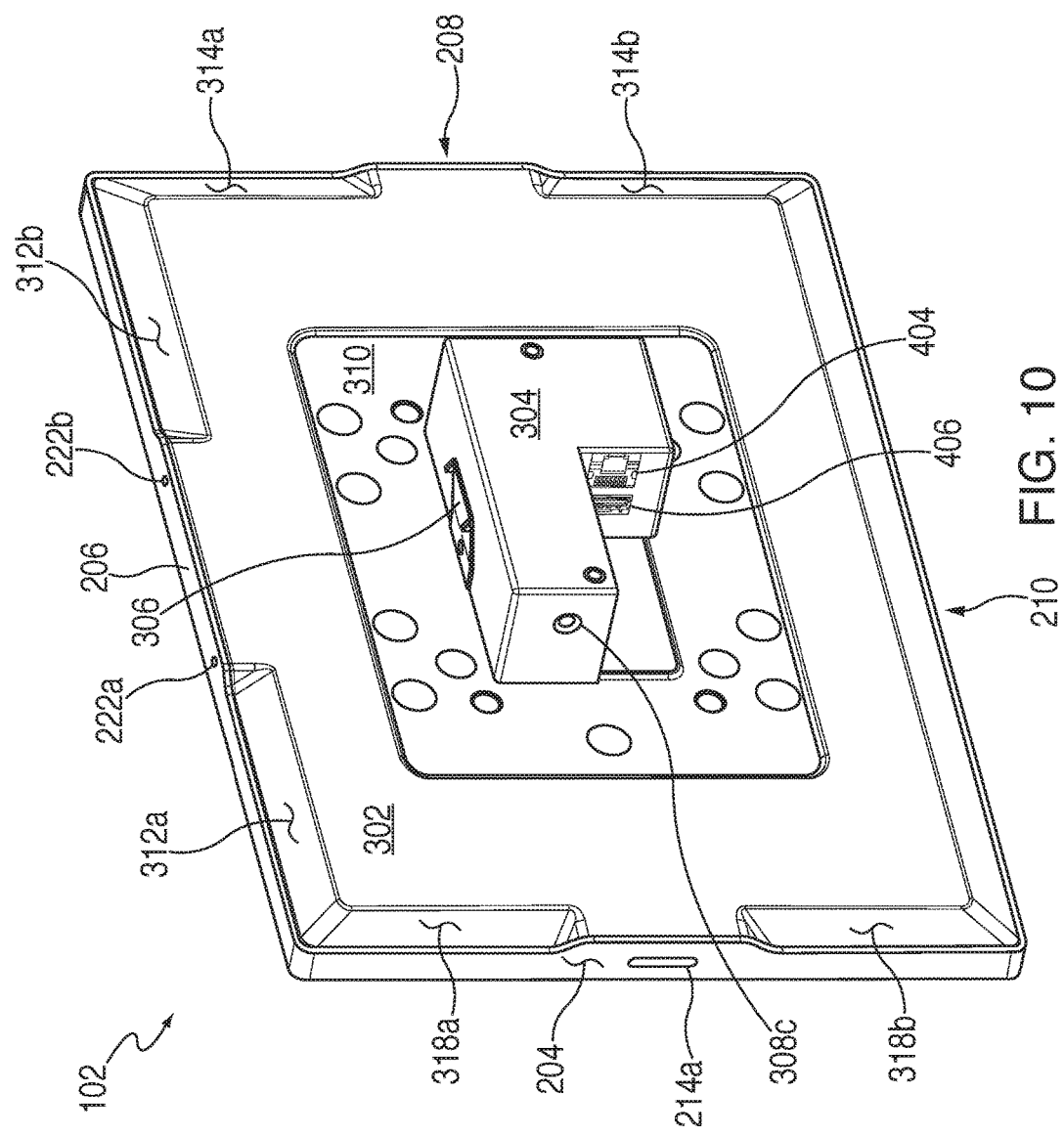

FIG. 10 illustrates a right side rear isometric left view of the wall mounted touch screen control device of FIG. 1.

Figure 11:
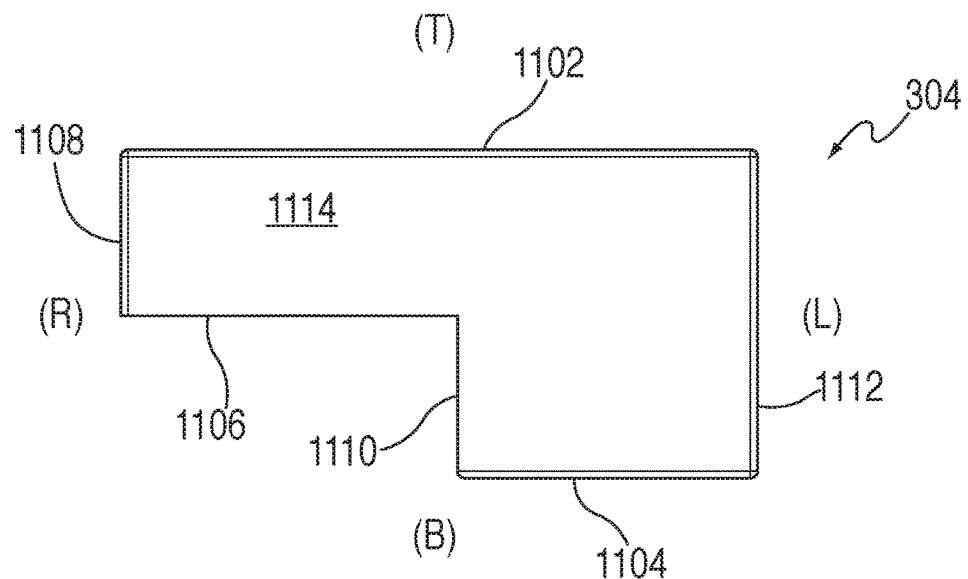

FIG. 11 illustrates a rear view of a circuitry enclosure for use with the wall mounted touch screen control device of FIG. 1.

Figure 12:
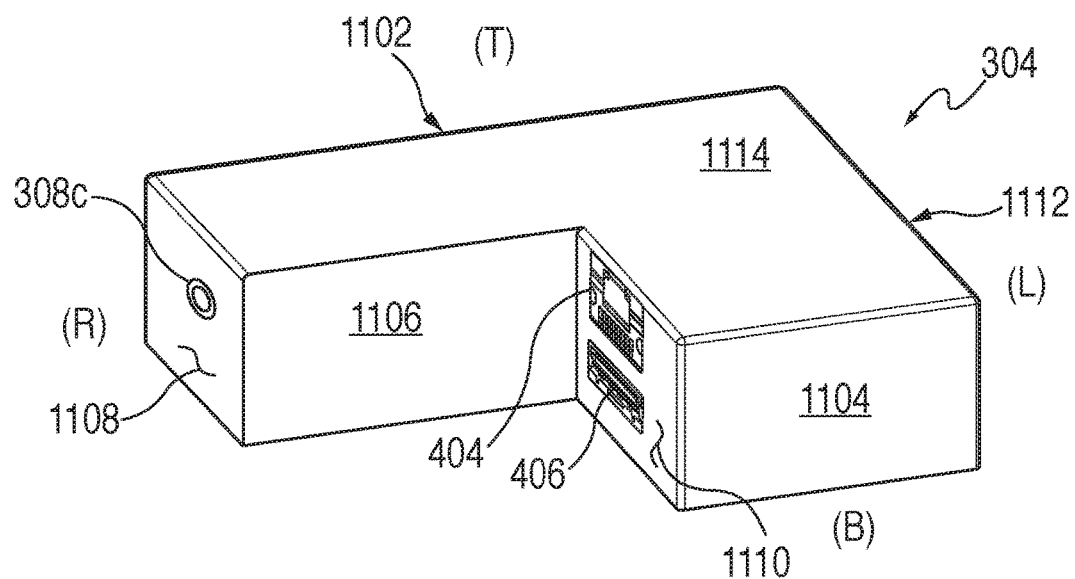

FIG. 12 illustrates an isometric view of the circuitry enclosure of FIG. 11 according to aspects of the embodiments.

Figure 13:
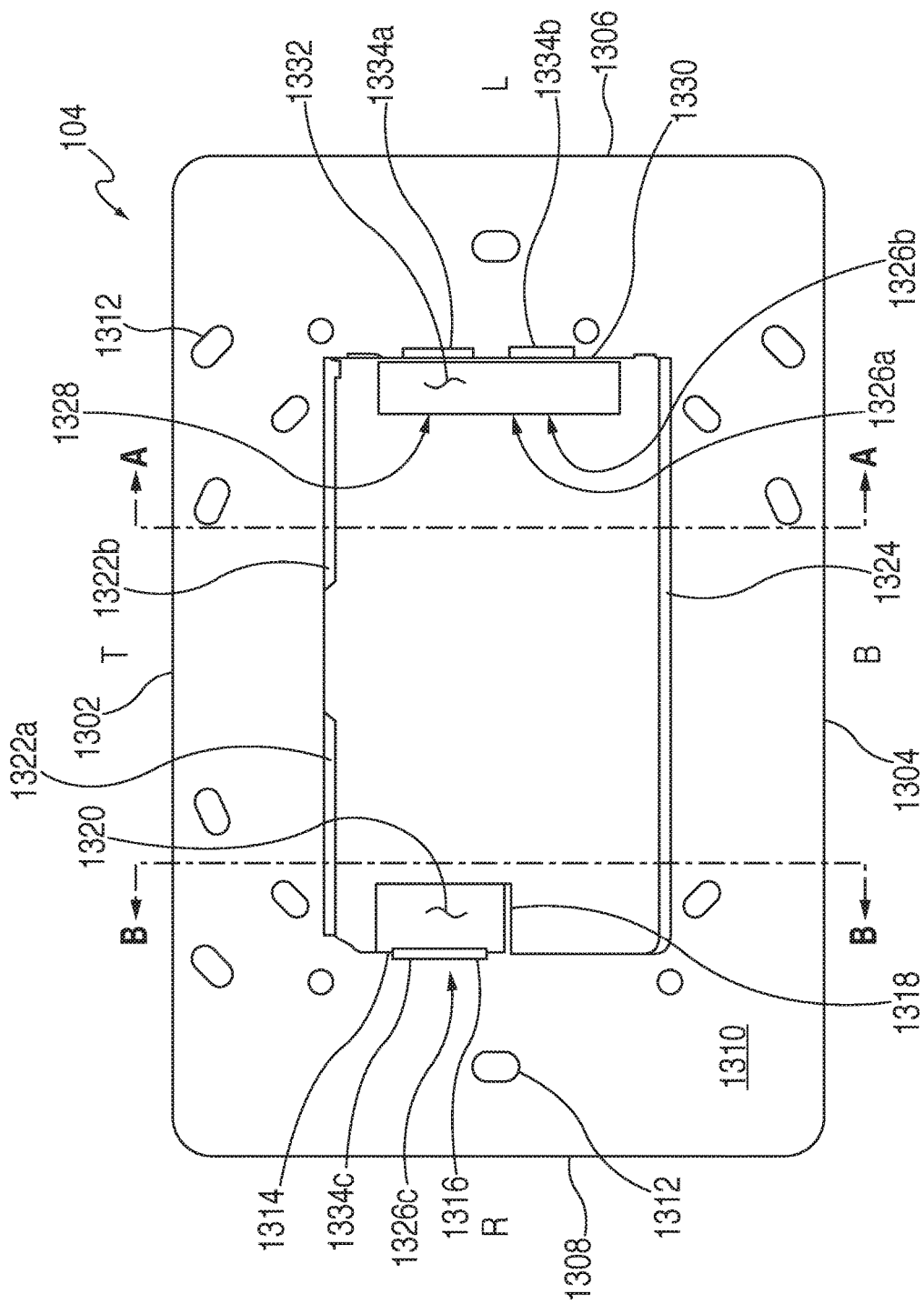

FIG. 13 illustrates a rear view of a mounting bracket for use with the wall mounted touch screen control device of FIG. 1 according to aspects of the embodiments.

Figure 14:
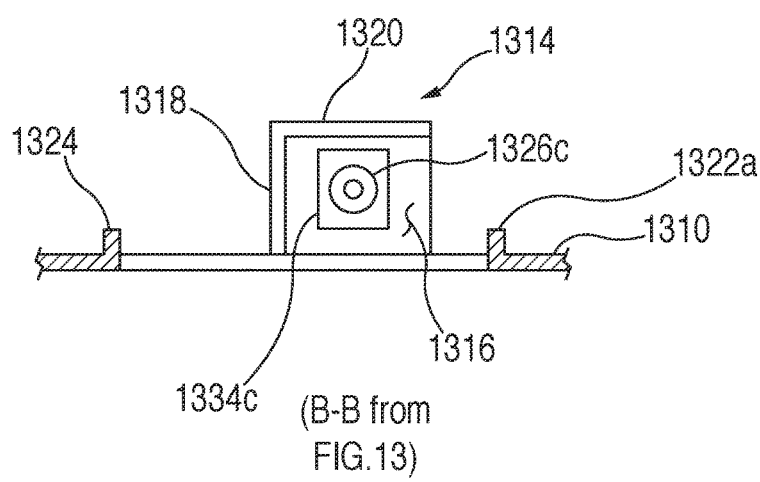

FIG. 14 illustrates a view along lines B-B in FIG. 13 of the mounting bracket according to aspects of the embodiments.

Figure 15:
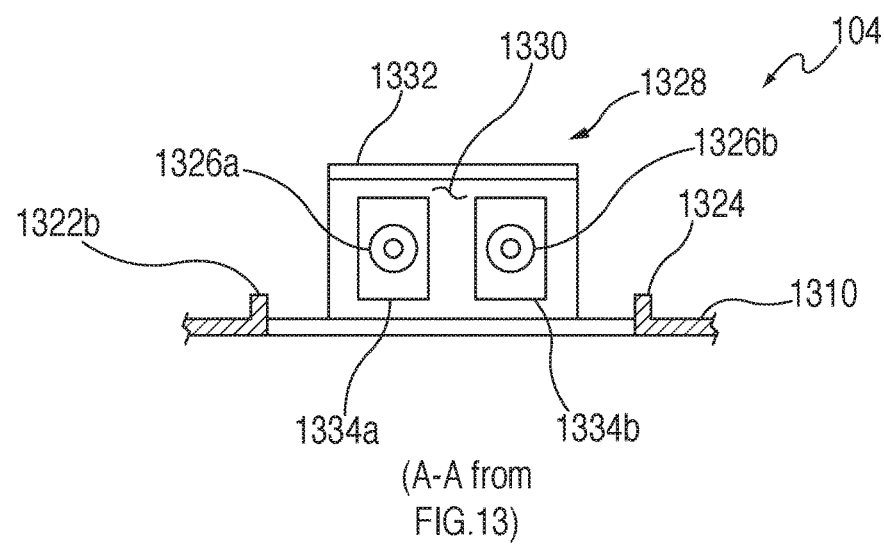

FIG. 15 illustrates a view along lines A-A in FIG. 13 of the mounting bracket according to aspects of the embodiments.

Figure 17:
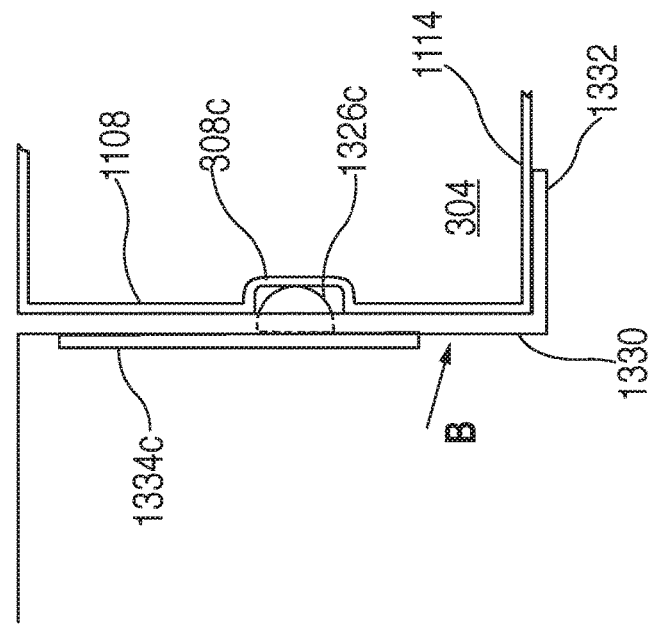
Figure 16:
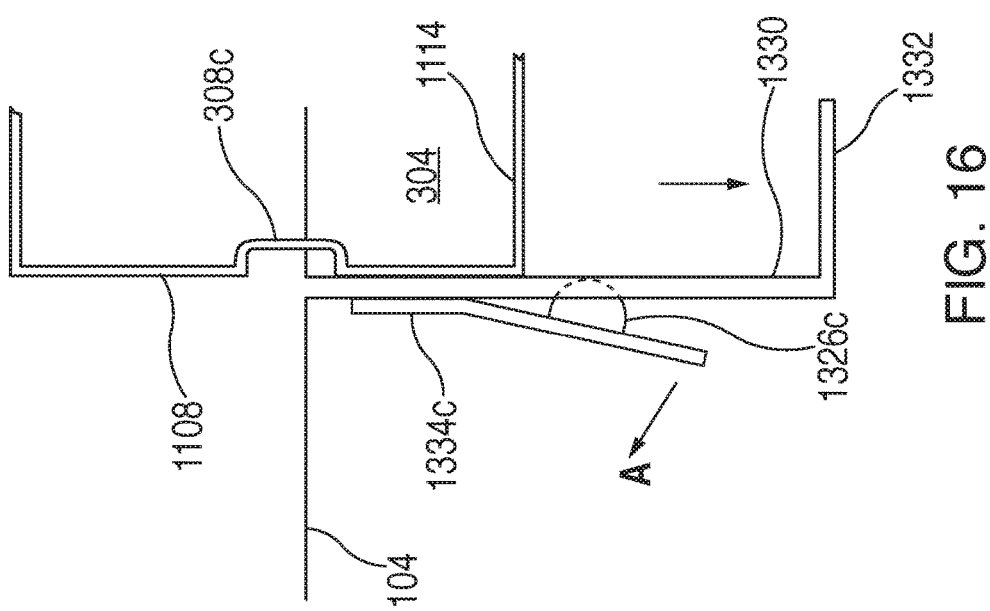

FIGS. 16 and 17 illustrate the insertion of the circuitry enclosure into the mounting bracket according to aspects of the embodiments.

Figure 18:
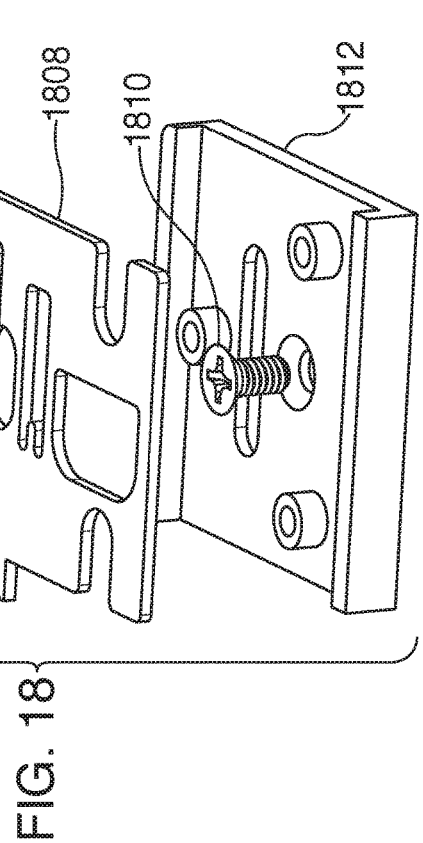

FIG. 18 illustrates an exploded perspective view of a security latching mechanism according to aspects of the embodiments.

Figure 19:
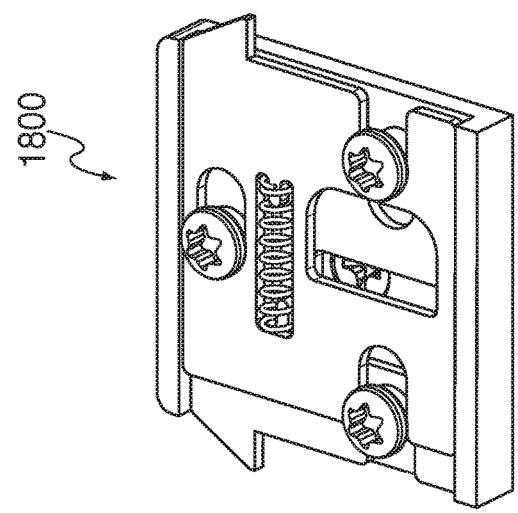

FIG. 19 illustrates a perspective view of an assembled security latching mechanism as shown in FIG. 18.

Figure 20:
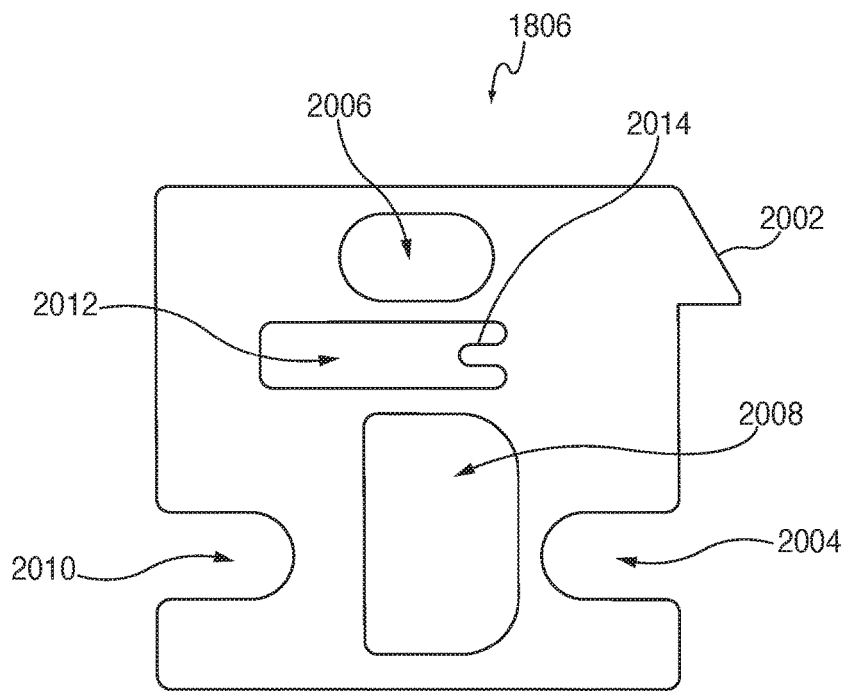

FIG. 20 illustrates a top view of an upper latching plate used in the security latching mechanism shown in FIGS. 18 and 19 according to aspects of the embodiments.

Figure 21:
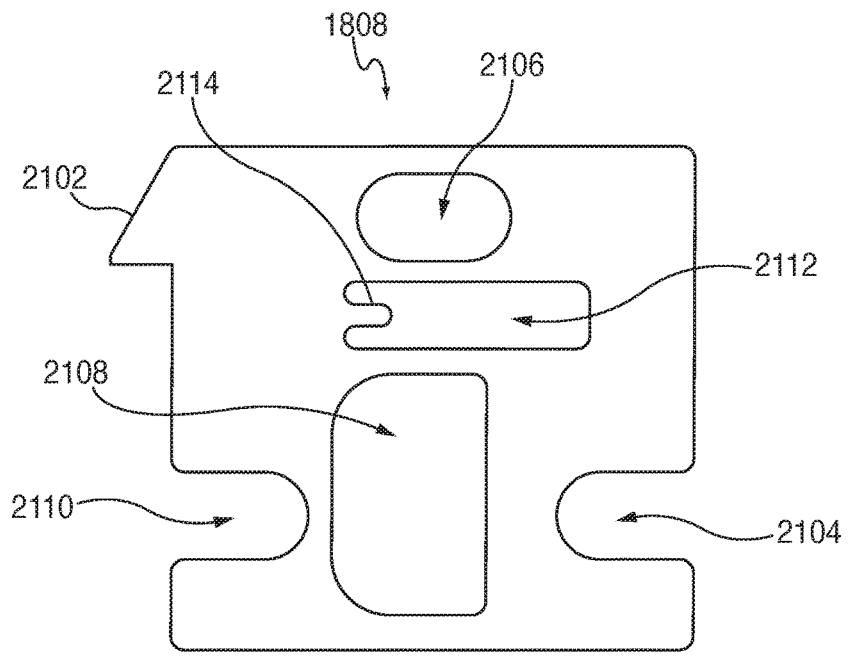

FIG. 21 illustrates a top view of a lower latching plate used in the security latching mechanism shown in FIGS. 18 and 19 according to aspects of the embodiments.

Figure 22:
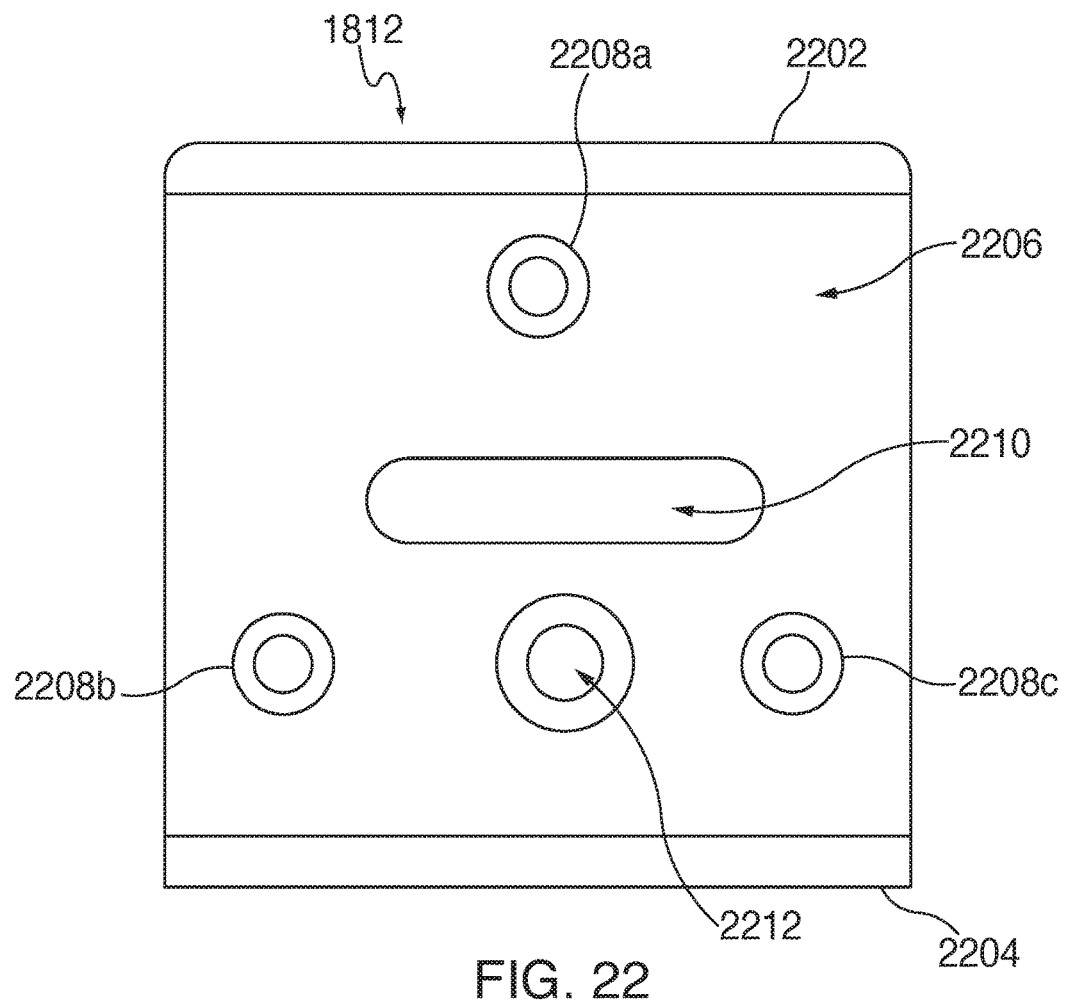

FIG. 22 illustrates a top view of a base plate used in the security latching mechanism shown in FIGS. 18 and 19 according to aspects of the embodiments.

Figure 23:
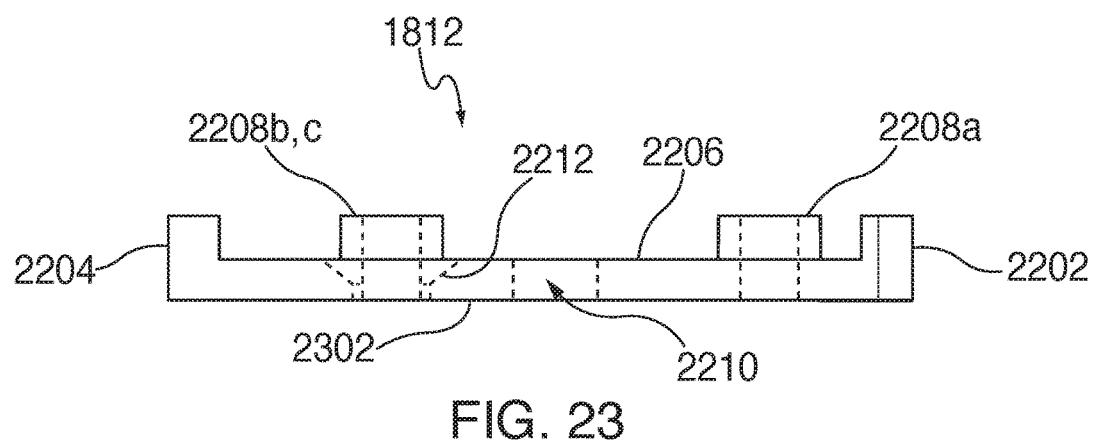

FIG. 23 illustrates a right side view of the base plate as shown in FIG. 22.

FIGS. 24-27 illustrate a series of top views of the assembled security latching mechanism of FIGS. 18 and 19 as the security latching mechanism progresses from an unlatched condition to a latched condition according to aspects of the embodiments.

Figure 28:
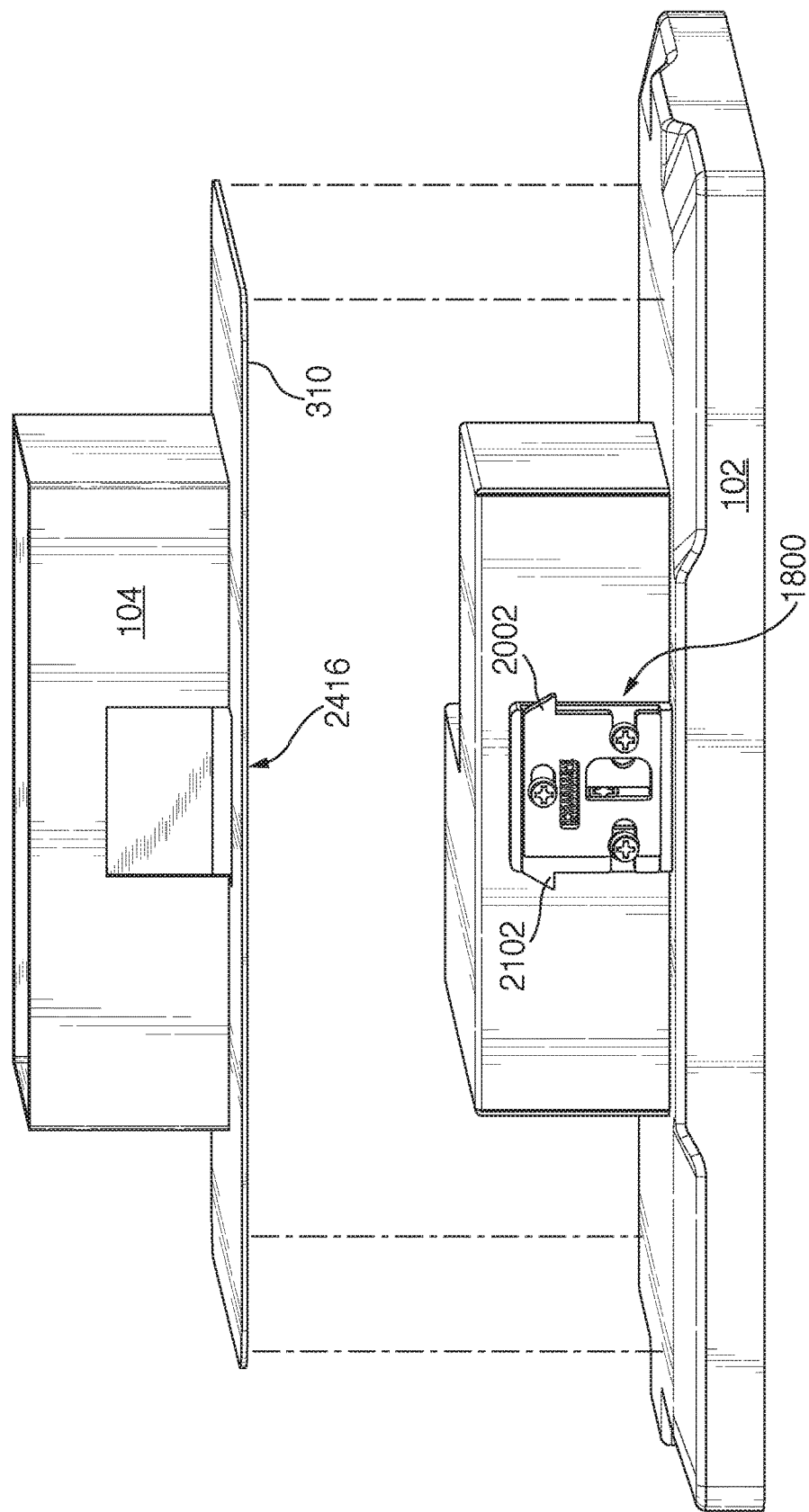
Figure 29:
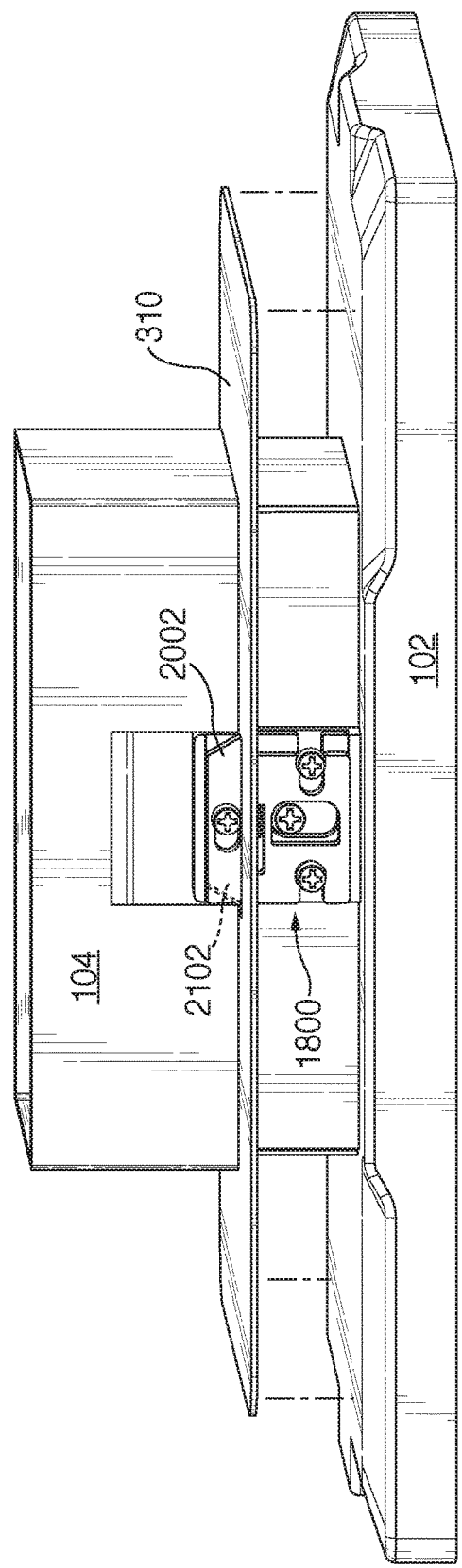
Figure 30:
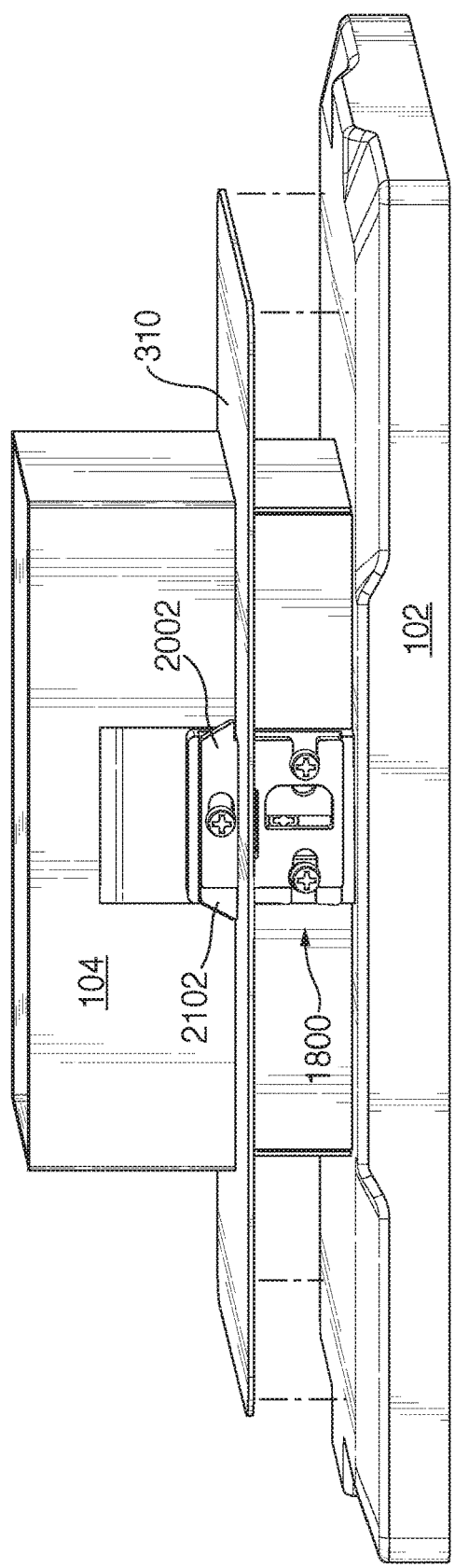

FIGS. 28-30 illustrate a series of top views of the assembled security latching mechanism of FIGS. 18 and 19 when the security latching mechanism is attached to a circuitry enclosure of a touch screen device, as the security latching mechanism progresses from an unlatched condition to a latched condition according to aspects of the embodiments.

Figure 31:
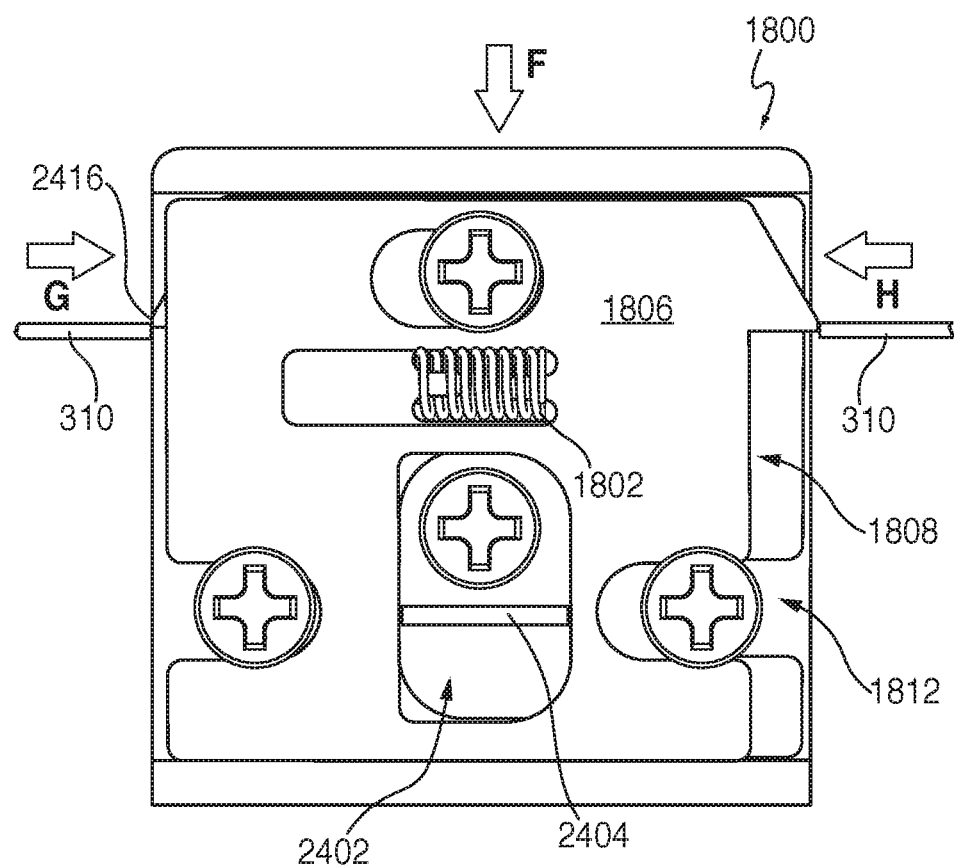

FIG. 31 illustrates a top view of the assembled security latching mechanism of FIGS. 18 and 19 when the security latching mechanism being retracted such that the touch screen device of FIG. 1 can be extracted from the mounting bracket.

DETAILED DESCRIPTION

The embodiments are described more fully hereinafter with reference to the accompanying drawings, in which aspects of the embodiments are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the aspects of the embodiments to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular device or class of devices used for control, such as touch screen control devices with a substantially thin wall mounting profile and integrated speakers.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments. Further still, it should be apparent to those of skill in the art that while certain items in the drawing Figures have been denoted "top," "bottom," "left side," right side," and the like, such spatial indicators are or can be arbitrary, and are done for the purposes of making it easier for the reader to understand and visualize the aspects of the embodiments and are not to be construed in a limiting manner.

List of Reference Numbers for the Elements in the Drawings in Numerical Order

The following is a list of the major elements in the drawings in numerical order.
100 Touch Screen Wall (TSW) Assembly
102 Touch Screen Control Device with Speakers (Touch Screen Device (TSD))
104 Mounting Bracket
106 Electrical Junction Box
108 Mounting Screws
110 Mounting Screw Receptacles
202 Front Surface
204 Right Side
206 Top
208 Left Side 210 Bottom
212 Rear Surface
214 Speaker
216 Display Panel
218 Display Panel Frame (Frame)
220 Camera
222 Microphone (Mic)
224 Light Sensor
302 Substantially Planar Portion
304 Circuitry Enclosure
306 Engagement Clip
308 Dimpled Mounting Recess
310 Recessed Planar Portion (Wall)
312 Top Chamfered Surface
314 Left Side Chamfered Surface
316 Bottom Chamfered Surface
318 Right Side Chamfered Surface
404 Ethernet Port
406 Universal Serial Bus (USB) Port
1102 Top of Circuitry Enclosure
1104 Bottom Left of Circuitry Enclosure
1106 Bottom Right of Circuitry Enclosure
1108 Top Right of Circuitry Enclosure
1110 Bottom Right of Circuitry Enclosure
1112 Left Side of Circuitry Enclosure
1114 Rear Surface of Circuitry Enclosure
1302 Top Side of Mounting Bracket
1304 Bottom Side of Mounting Bracket
1306 Left Side of Mounting Bracket
1308 Right Side of Mounting Bracket
1310 Rear Surface of Mounting Bracket
1312 Mounting Holes of Mounting Bracket
1314 First Electronics Enclosure Cage (First Cage)
1316 First Vertical Surface of First Cage
1318 Second Vertical Surface of First Cage
1320 Horizontal Surface of First Cage
1322 First Electronics Enclosure Wall
1324 Second Electronics Enclosure Wall
1326 Dimpled Mounting Protrusion
1328 Second Electronics Enclosure Cage (Second Cage)
1330 Vertical Surface Second Cage
1332 Horizontal Surface Second Cage
1334 Spring Loaded Dimple Mount
1800 Security Latching Mechanism (SLM)
1802 Spring
1804 Latch Screw
1806 Upper Latching Plate (ULP)
1808 Lower Latching Plate (LLP)
1810 Securing Screw
1812 Base Plate (BP)
2002 Upper Plate Latch
2004 Upper Plate First Screw Slot
2006 First Sliding Aperture
2008 Upper Plate Retraction Aperture
2010 Upper Plate Second Screw Slot
2012 Upper Plate Spring Aperture
2014 Upper Plate Spring Retention Pin
2102 Lower Plate Latch
2104 Lower Plate First Screw Slot
2106 Second Sliding Aperture
2108 Lower Plate Retraction Aperture
2110 Lower Plate Second Screw Slot
2112 Lower Plate Spring Aperture
2114 Lower Plate Spring Retention Pin
2202 Base Plate First Channel Wall (First Channel Wall)
2204 Base Plate Second Channel Wall (Second Channel Wall)
2206 Base Plate Upper Surface (Upper Surface)
2208 Base Plate Guide Post
2210 Spring Aperture
2212 Security Latching Mechanism Securing Screw Hole
2302 Base Plate Lower Surface (Lower Surface)
2402 De-Latching Aperture
2404 De-Latching Device (Typically, a slot-headed screwdriver)
2406 Upper Latching Plate Latch Horizontal Surface
2408 Upper Latching Plate Latch Sloped Surface
2410 Lower Latching Plate Latch Horizontal Surface
2412 Lower Latching Plate Sloped Surface
2416 Hole in Mounting Bracket
3002 Guide List of Acronyms Used in the Specification in Alphabetical Order The following is a list of acronyms used in the specification in alphabetical order.
BP Base Plate
Cat5 Category 5 Ethernet
D Depth
H Height
IEEE Institute of Electrical and Electronic Engineers
LCD Liquid Crystal Device
LED Light Emitting Diode
LLP Lower Latching Plate
Mic Microphone
PoE Power over Ethernet
SLM Security Latching Mechanism
TSD Touch Screen Device
TSW Touch Screen Wall
ULP Upper Latching Plate
USB Universal Serial Bus
W Width The different aspects of the embodiments described herein pertain to the context of a touch screen control device that has integrated within it one or more speakers, but yet which maintains a substantially thin mounting profile, but is not limited thereto, except as may be set forth expressly in the appended claims.

For over 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life to those who work and live in commercial buildings, universities, hotels, hospitals, and homes, among other locations. Accordingly, the systems, methods, and modes of the aspects of the embodiments described herein, as embodied as touch screen control device 100 that has integrated within it one or more speakers, but yet which maintains a substantially thin mounting profile, can be manufactured by Crestron Electronics Inc., located in Rockleigh, N.J., which can be marketed and sold under the name of "TSW-XX60 Wall Mount Touch Screen Family."

FIG. 1 illustrates a front isometric view of wall mounted touch screen control device assembly (assembly) 100 according to aspects of the embodiments. Assembly 100 comprises touch screen control device (touch screen device (TSD)) 102, mounting bracket 104, electrical junction box (box) 106, mounting screws 108, and mounting screw receptacles 110 according to aspects of the embodiments. Box 106 can be a conventional junction box, known to those of skill in the art, or can be a specially built junction box, but in either case, in this use, it provides a means for mounting TSD 102 to the wall in a substantially secure but readily and relatively easily removable manner, as described below.

FIG. 2 illustrates a front isometric view of TSD 102 with integrated speakers 214, FIG. 3 illustrates a left side rear isometric view of TSD 102, FIG. 4 illustrates a right side view of TSD 102, FIG. 5 illustrates a front view of TSD 102, FIG. 6 illustrates a left side view of TSD 102, FIG. 7 illustrates a top view of TSD 102, FIG. 8 illustrates a bottom view of TSD 102, FIG. 9 illustrates a rear view of TSD 102, and FIG. 10 illustrates a right side rear isometric left view of TSD 102, all according to aspects of the embodiments.

Referring now to FIG. 1, TSD 102 comprises front surface 202, which is comprised of display panel (display) 216, and frame 218. Display 216 is typically a flat panel liquid crystal display (LCD), the use of which in touch panels is substantially ubiquitous in currently available displays, but, as those of the skill in the art can appreciate, the aspects of the embodiments are not limited thereto. For example, there are light emitting diode (LED) back-lit LCD displays, and also LED displays in use as well. TSD 102 further comprises right side 204, top 206, left side 208, and bottom 210. In addition, there is also rear surface 212, and located on both right and left sides respectively, first and second speakers 214*a,b*, though none or only one speaker 214 can be included in TSD 102 according to aspects of the embodiments. As can be seen in FIG. 2, TSD 102 has a width W, height H, and depth (or thickness) D. According to aspects of the embodiments, TSD 102 is substantially flat and planar, and has dimensions of W that are many multiples of the depth D, and dimensions of H that are also many multiples of the depth D (but not as many as in regard to the width W). According to aspects of the embodiments, H can range from about 3.649" to about 6.451", W can range from about 5.560" to about 10.114", and D, which can also be considered the distance from the wall upon which TSD 102 is mounted to the front panel, is about 0.468", and can range from about 0.4212" to about 0.5148", according to aspects of the embodiments.

TSD 102 also further includes chamfered edges on the right, left, top, and bottom sides, and which are shown more clearly in other Figures (see, e.g., FIG. 6, described in greater detail below). Also shown in FIG. 2 are camera 220, and mics 222*a,b*, and light sensor 224; as those of skill in the art can appreciate, camera 220 can provide many different uses: security, communications through video "chat" services such as Skype®, among others (including video conferencing). The output of camera 220 can be shown on the same TSW assembly 100, or can be sent to other TSWs 100, via H.264 IP steam. Camera 220 can also be used to take snapshots, or photos, which can then be used for many different applications such as badges, identity cards, and the like. Mics 222*a-c* provide a means for a user to communicate through voice alone, or in conjunction with camera 220, through an audio/video interface, and speakers 214 can reproduce sounds such as voice, music, tones, beeps, whistles, among other types. Speakers 214*a,b* can also be stereo speakers, and can provide intercom capability when used with mics 222*a,b*. According to still further aspects of the embodiments, TSD 102 can conform to ITU-T Recommendation P.340: Transmission Characteristics and Speech Quality Parameters of Hands-Free Terminals. Further still, TSD 102 can support 16 KHz audio playback.

According to aspects of the embodiments, light sensor 224 can be further included. Such light sensor 224 can be used to automatically adjust the back-light illumination level of TSD 102 based on room brightness.

FIG. 3 illustrates a left side rear perspective (or isometric) view of TSD 102 according to aspects of the embodiments. In FIG. 3, it can be seen that TSD 102 comprises substantially planar portion 302, circuitry enclosure 304 (which is described in greater detail in FIGS. 11-15, along with mounting bracket 104), an optional engagement clip 306 (which can be used to facilitate securing of TSD 102 to box 106), a plurality of dimpled mounting recesses 308, recessed planar portion 310 (which, as its name implies, is a slightly recessed planar area surrounding circuitry enclosure 304, and is generally rectangular in shape in these aspects of the embodiments), top chamfered surface 312*a,b*, left side chamfered surface 314*a,b*, bottom chamfered surface 316, and right side chamfered surface 318*a,b*, according to aspects of the embodiments.

According to aspects of the embodiments, the chamfered surfaces (312, 314, 316, and 318) are formed at about an angle of $\theta_1$ (shown in FIG. 6) from rear surface 212, which is about 18°, and which can range from about 10° to about 26° according to aspects of the embodiments. Because of their location about the perimeter of TSD 102, the chamfered surfaces provide a means for relatively easy removal of TSD 102 from junction box 106. That is, the chamfered surfaces 312, 314, 316, and 318 provide a means for a user to insert their finger or fingers in order to pry TSD 102 from its mounting bracket 104 that will remain secured to box 106. The mounting of TSD 102 to bracket 104 and box 106 is described in greater detail below in regard to FIGS. 11-15.

As can be seen in the Figures, the chamfered surfaces 312, 314, 316, 318, are formed along an outer portion that surrounds a periphery of a rear surface of TSD 102. The outer portion has a certain, predefined width that can vary from between about a first distance to about a second distance. As can be further seen in FIGS. 3, 9, and 10, the chamfered surfaces 312, 314, 316, 318 that comprises the outer portion of the rear surface of TSD 102 includes a majority of the outer portion. The chamfered surfaces 312, 314, 316, 318 provides an aesthetically pleasing appearance to TSD 102, as well as facilitating installation of TSD 102 into mounting bracket 104 and then into junction box 106 according to aspects of the embodiments.

FIG. 4 illustrates a right side view of TSD 102, and in this view both Ethernet port 404 (which can be an RJ45 type receptacle, as those of skill in the art can appreciate) and universal serial bus (USB) port 406 can be seen on the right side of circuitry enclosure 304 according to aspects of the embodiments. Ethernet port 404 can be used to connect an Ethernet cable to TSD 102, for both data communications and power-over-Ethernet (PoE) purposes; that is, one cable, an Ethernet cable, can connect to TSD 102 and communication data and commands to and from TSD 102 to different devices, and carry power to TSD 102 using known PoE techniques.

As those of skill in the art can appreciate, the Institute of Electrical and Electronic Engineers (IEEE) standard for PoE requires category 5 (Cat5) cable or higher for high power levels, but can operate with category 3 cable if less power is required. Power can be supplied in common mode over two or more of the differential pairs of wires found in the Ethernet cables, and comes from a power supply within a PoE-enabled networking device such as an Ethernet switch, or can be injected into a cable run with a mid-span power supply. A mid-span (PoE) power injector is an additional PoE power source that can be used in combination with a non-PoE Switch. Mid-span devices currently available operate in accordance with two IEEE standards: those operating in accordance with IEEE 802.3af provide about 15.4 watts per port (or link), and those operating in accordance with IEEE802.3at (PoE Plus) can provide to about 25.5 watts per port.

USB port 406 can be used to connect a USB cable to TSD 102; however, according to aspects of the embodiments, a user can also use USB port 406 to connect a flash drive to TSD 102 in order to transfer data between TSD 102 and the flash drive; that is, users can download programs to TSD 102 to provide up-to-date changes and capabilities, or to retrieve data in some circumstances. Through implementation of Ethernet port 404 and USB port 406 there is built in redundancy for data gathering and program/application downloading.

As seen in FIGS. 2-4, 6, and 10, each of the left and right speakers 214*a,b* are mounted on respective side walls such that their long axis is substantially vertical, and the bulk of the speaker, which is contained within the frame of TSD 102, faces inwardly, in a substantially horizontal direction, so that a minimal amount of depth is needed to mount TSD 102 according to aspects of the embodiments.

FIG. 11 illustrates a rear view of circuitry enclosure 304 for use with TSD 102. Circuity enclosure 304 includes top 1101, bottom right side 1104, bottom left side 1106, top right side 1108, bottom right side 1110, left side 1112, and rear surface 1114. FIG. 12 illustrates an isometric view of circuitry enclosure 304 in which Ethernet port 404 and USB port 406 are seen located on bottom right side 1110. Located on top right side 1108 is dimple mounting recess 308*c;* dimple mounting recesses 308*a,b* are located on left side 1112.

Circuitry enclosure 304 is manufactured as an integral component of TSD 102 according to aspects of the embodiments, though it could be a separate component that could be attached to rear surface 212 in other aspects of the embodiments. Circuity enclosure 304 provides the means for mounting TSB 102 to junction box 106 such that TSD 102 is substantially parallel with the wall upon which it is mounted, and, because of its relative thinness compared to other wall mount controllers, is mounted relative close to the surface of the wall. In use, circuitry enclosure 304 is inserted into mounting bracket 104 that has been screwed to, or attached in some substantially similar manner, junction box 106 according to aspects of the embodiments. Insertion of circuitry enclosure 304 can only be done in one orientation because of the substantially matching "L" shapes of circuity enclosure 304 and mounting bracket 104. Further, as will be explained in greater detail in regard to FIGS. 12-15, the spring loaded dimpled mounting protrusions 1326*a-c* of mounting bracket 104 fit into dimpled mounting recesses 308*a-c* to retain TSD 102 to mounting bracket 104 and junction box 106 according to aspects of the embodiments.

FIG. 13 illustrates a rear view of mounting bracket 104 for use with TSD 102 according to aspects of the embodiments. Mounting bracket (bracket) 104 comprises top side 1302, bottom side 1304, left side 1306, right side 1308, and rear surface 1310. Rear mounting surface is substantially planar except in the portions as described below. Also part of bracket 104 are a plurality of mounting holes 1312, first electronics enclosure wall 1322, and second electronics enclosure wall 1324, the latter two of which are located such that they fit about the walls of circuitry enclosure 304. Two sub-assemblies are also included as part of bracket 104: first electronics enclosure cage (first cage) 1314, and second electronics enclosure cage (second cage) 1328. First cage 1314 comprises first vertical surface of first cage 1316, second vertical surface of first cage 1318, horizontal surface of first cage 1320, and spring loaded dimple mount 1334*c,* upon which is mounted dimpled mounting protrusion 1326*c.* The assembly of the parts of first cage 1314 are such that they will fit about only one particular portion of circuitry enclosure 304; that which is comprised of the surfaces of top right 1108, and bottom right 1106; that is, the right side of circuitry enclosure 304 according to aspects of the embodiments.

Second cage 1328 comprises vertical surface second cage 1330, horizontal surface second cage 1332, and spring loaded dimple mounts 1334*a,b,* upon which are mounted dimpled mounting protrusions 1326*a,b.* The assembly of the parts of second cage 1328 are such that they will fit about only one particular portion of circuitry enclosure 304; that which is comprised of the surfaces of bottom left 1104, and left side 1112; that is, the left side of circuitry enclosure 304 according to aspects of the embodiments.

Referring now to FIG. 14, which illustrates a view along lines B-B in FIG. 13 of mounting bracket 104 according to aspects of the embodiments, first cage 1314 can be seen including spring loaded dimple mount (dimple mount) 1334*c.* According to aspects of the embodiments, dimple mount 1334*c* contains dimpled mounting protrusion 1326*c,* which, as shown and described below in regards to FIGS. 16 and 17, is designed to fit within dimpled mounting recess 308*c* that is located on top right surface 1108 of circuitry enclosure 304. According to aspects of the embodiments, the enclosure of dimpled mounting protrusion 1326*c* by dimpled mounting recess 308*c* (along with a substantially similar arrangement and enclosure by dimpled mounting recesses 308*a,b* of dimpled mounting protrusions 1326*a,b*) retains TSD 102 by bracket 104. Dimple mount 1334*c* can be attached to first cage 1314 by means of ultra-sonic welding, arc-welding, soldering, or by glues, or mechanical means of attachment such as screws, nuts and bolts, among other means of attachment.

Referring now to FIG. 15, which illustrates a view along lines A-A in FIG. 13 of mounting bracket 104 according to aspects of the embodiments, second cage 1328 can be seen including spring loaded dimple mounts (dimple mount) 1334*a,b.* According to aspects of the embodiments, dimple mounts 1334*a,b* contains dimpled mounting protrusions 1326*a,b,* which, as shown and described below in regards to FIGS. 16 and 17, is designed to fit within dimpled mounting recesses 308*a,b* that is located on left side surface 1112 of circuitry enclosure 304. According to aspects of the embodiments, the enclosure of dimpled mounting protrusions 1326*a,b* by dimpled mounting recesses 308*a,b* retains TSD 102 by bracket 104. Dimple mounts 1334*a,b* can be attached to second cage 1328 by means of ultra-sonic welding, arc-welding, soldering, or by glues, or mechanical means of attachment such as screws, nuts and bolts, among other means of attachment.

FIGS. 16 and 17 illustrate the insertion of circuitry enclosure 304 into mounting bracket 104 according to aspects of the embodiments. In FIG. 16, rear surface 1114 of circuitry enclosure 304, along right side 1108, is being forced against dimpled mounting protrusion 1326*c* as TSD 102 is being forced into mounting bracket 104. Spring loaded dimple mount 1334*c* is being forced in the direction of arrow A. Once circuitry enclosure 304 of TSD 102 has been inserted a predefined distance into mounting bracket 104 (FIG. 17), dimpled mounting recess 308*c* becomes co-located with dimpled mounting protrusion 1326*c* (dimpled mounting protrusion 1326*c* fits within a hole in vertical surface second cage 1330), and the spring action of spring loaded dimple mount 1334*c* causes it to move in the direction of arrow B such that dimpled mounting protrusion 1326c fits within dimpled mounting recess 308c; a substantially similar process occurs on the other side of mounting bracket 104 and circuitry enclosure 304, between dimpled mounting protrusions 1326a,b, and dimpled mounting recessed 308a,b according to aspects of the embodiments.

According to further aspects of the embodiments, magnets can be used to secure TSD 102 to either mounting 104, or in the absence of mounting bracket 104, TSAD 102 can be mounted directly to junction box 106, if the latter were made of a ferromagnetic material. According to further aspects of the embodiments, such magnets can include rare earth type magnets.

According to aspects of the embodiments, a table mount kit accessory can be used with TSD 102. The table mount kit allows TSD 102 to be placed onto a tabletop surface, such as on a conference room table for commercial applications, or on a bedside/chairside table for residential applications. The table mount kit can include a substantially non-slip surface on the table-contacting face that prevents TSD 102 from sliding across the table when a user presses display panel 216. In addition, a swivel assembly can be used that allows TSD 102 and table mount kit to be permanently secured to the table, where it can then also be rotated. According to still further aspects of the embodiments, a user can adjust the tilt angle of TSD 102. According to aspects of the embodiments, the tilt range can range from about 35° to about 50° from the horizontal.

FIG. 18 illustrates an exploded view of security latching mechanism (SLM) 1800 according to aspects of the embodiments, and FIG. 19 illustrates a perspective view of an assembled SLM 1800 as shown in FIG. 18. SLM 1800 comprises spring 1802, latch screws 1804a-c, upper latching plate (ULP) 1806, lower latching plate (LLP) 1808, and base plate (BP) 1812. Assembled, and secured to TSD 102, SLM 1800 substantially prevents inadvertent (or malicious) removal of TSD 102 from mounting bracket 104, which is secured to electrical junction box 106, as shown in FIG. 1, among other Figures. That is, SLM 1800 can substantially prevent, or at least impede, the inadvertent/malicious removal of SLM 1800 from a wall mounted condition. As described in greater detail infra, SLM 1800 is secured to TSD 102 at a top, centered position of circuitry enclosure 304, where engagement clip 306 is shown in FIG. 3, via at least one securing device, through use of a securing device mating mechanism (generally a screw and threaded screw hole). As can be seen in FIGS. 18 and 19, SLM 1800 is assembled by positioning ULP 1804 on top of LLP 1806 to BP 1812, and securing the two to BP 1812 using three latch screws 1804a-c threaded into respective threaded receptacles (base plate guide posts 2208a-c, located on BP 1812). Spring 1802 is located in the manner shown in FIG. 19, and its installation and operation is described in greater detail infra.

FIG. 20 illustrates a top view of ULP 1806 used in SLM 1800 shown in FIGS. 18 and 19 according to aspects of the embodiments. ULP 1806 is substantially planar, and rectangular in shape, though it does not necessarily need to be. ULP 1806 comprises upper plate latch 2002, upper plate first screw slot 2004, first sliding aperture 2006, upper plate retraction hole 2008, upper plate second screw slot 2010, upper plate spring aperture 2012, and upper plate spring retention pin 2014. According to aspects of the embodiments, upper plate latch (latch) 2002 is generally triangular in shape, though that need not necessarily be the case. The design and use of latch 2002 is described in greater detail infra in regard to FIGS. 24-27. Further, use of upper plate retraction aperture 2008 when latching of SLM 1800 is accomplished through the use of spring 1802, in a manner to be described in greater detail infra, in regard to FIGS. 24-27.

ULP 1806 further comprises first and second screw slots 2004 and 2010, as well as first sliding aperture 2006, through which screws 1804 can be located, and which are positioned and sized to allow a side-to-side sliding movement of ULP 1806 around base plate guide posts 2208, which are shown in greater detail in FIG. 22. Screws 1804a-c (other retentions means that can also be used to equal effect) facilitate the planar operation of upper and lower plates 1806, 1808 by preventing them from moving up and away from base plate 1812.

FIG. 21 illustrates a top view of LLP 1808 used in SLM 1800 shown in FIGS. 18 and 19 according to aspects of the embodiments. LLP 1808 is substantially planar, and rectangular in shape, though it does not necessarily need to be. LLP 1808 comprises lower plate latch 2102, lower plate first screw slot 2104, second sliding aperture 2106, lower plate retraction hole 2108, lower plate second screw slot 2110, lower plate spring aperture 2112, and lower plate spring retention pin 2114. According to aspects of the embodiments, lower plate latch (latch) 2102 is generally triangular in shape, though that need not necessarily be the case. The design and use of latch 2102 is described in greater detail infra in regard to FIGS. 24-27. Further, use of lower plate retraction aperture 2108 when latching of SLM 1800 is accomplished through the use of spring 1802, in a manner to be described in greater detail infra, in regard to FIGS. 24-27.

LLP 1808 further comprises first and second screw slots 2104 and 2110, as well as second sliding aperture 2106, through which screws 1804a-c can be located, and which are positioned and sized to allow a side-to-side sliding movement of LLP 1808 around base plate guide posts 2208, which are shown in greater detail in FIG. 22. Screws 1804a-c (other retentions means that can also be used to equal effect) facilitate the planar operation of upper and lower plates 1806, 1808 by preventing them from moving up and away from base plate 1812.

FIG. 22 illustrates a top view of base plate (BP) 1812 used in SLM 1800 shown in FIGS. 18 and 19 according to aspects of the embodiments. Like ULP and LLP 1806, 1808, BP 1812 is substantially planar, and relatively thin and rectangular in shape. According to an aspect of the embodiments, ULP 1806, LLP 1808, and BP 1812 are generally about the same size dimensions in length and width, though not necessarily in thickness; according to further aspects of the embodiments, ULP 1806 and LLP 1808 are sized and shaped to fit within BP first and second channel walls (channel walls) 2202, 2204, respectively, in a relatively unimpeded sliding manner. That is, when assembled as shown in FIGS. 18, 19 and 24-30, ULP 1806 and LLP 1808 are sized and shaped such that ULP 1806 and LLP 1808 can slidingly engage with each other, in a side-to-side motion, and LLP 1808 can also slidingly engage with an upper surface of BP 1812 in a side-to-side motion.

FIG. 23 illustrates a right side view of BP 1812 as shown in FIG. 22. BP 1812 further comprises BP guide posts 2208a-c, spring aperture 2210, and SLM securing screw hole (screw hole) 2212. Referring back to FIG. 18, securing screw 1810 can be located within screw hole 2212 to secure SLM 1800 to an appropriately sized and located threaded hole in mounting bracket 104. As shown in FIG. 19, securing screw 1810 lies substantially flush with upper surface 2206 of BP 1812 when screw 1810 is threaded into the threaded receptacle located in mounting bracket 104 such that LLP 1808 can slide back and forth across upper surface 2206 of BP 1812. Screw hole 2212 is countersunk such that an upper surface of screw 1810 is substantially co-planer with upper surface 2206 of BP 1812 to facilitate the substantially smooth sliding operation of LLP 1808 with respect to BP 1812. As seen in at least FIGS. 18 and 23, screw 1810 is held in place by LLP 1808; an installer can insert a Phillip's head screwdriver into the space formed by the intersection of 2008 and 2108 to secure SLM 1800 to TSD 102 via screw 1810. Even when SLM 1800 is removed from TSD 102, screw 1810 remains in place, so that SLM remains as a complete assembly, ready for re-attachment to TSD 102 according to aspects of the embodiments.

FIGS. 24-27 illustrate a series of top views of the assembled SLM 1800 of FIGS. 18 and 19 as SLM 1800 progresses from an unlatched condition to a latched condition according to aspects of the embodiments.

Figure 24:
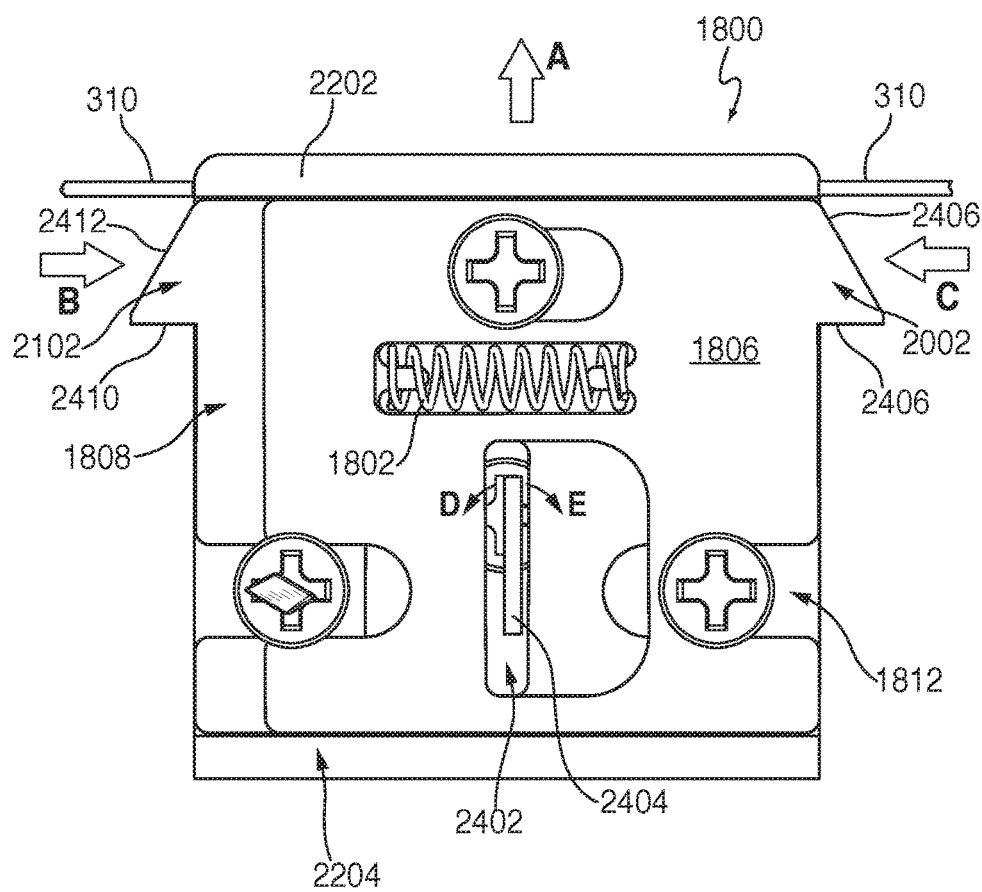

FIG. 24 illustrates a top view of an assembled SLM 1800 in a normally extended condition according to aspects of the embodiments, as SLM 1800 is being inserted into hole 2416 of planar portion (wall) 310 of mounting bracket 104. In its normally extended condition, as shown in FIG. 24, both ULP 1806 and LLP 1808 are fully extended outwardly from BP 1812. Spring 1802, retained by lower retention pin 2114 and upper retention pin 2014, is substantially fully extended, with enough expansive force to keep it retained and recessed within upper plate spring aperture 2012, lower plate spring aperture 2112, and spring aperture 2210 (which is located on BP 1812). In this manner, spring 1802 is substantially planarly aligned with ULP 1806, LLP 1808, and BP 1812. The apertures 2012, 2112, and 2210 keep spring 1802 in substantial alignment with pins 2014 and 2114, so that spring 1802 does not bow upward or away from ULP 1806 and LLP 1808.

As described supra, spring 1802 provides an expansive force to both of ULP 1806 and LLP 1808 to keep them in a normally extended condition—that is, with respective latches 2002 and 2102 extended out from BP 1812 according to aspects of the embodiments. Screw 1804a assists in maintaining ULP 1806 and LLP 1808 in a planar arrangement, and in addition, provides a securing means to prevent ULP 1806 and LLP 1808 from being ejected from their assembled condition in regard to BP 1812—that is, as shown in FIG. 24, screw 1804a is in contact with a left most position of first sliding aperture 2106 and a right-most position of second sliding aperture 2106 thus prevent both of ULP 1806 and LLP 1808 from sliding any further outwardly. Screw 1804a in concert with the opposite sides of first sliding aperture 2106 and second sliding aperture 2106 will also prevent ULP 1806 and LLP 1808 from moving too far inwardly.

As further shown in FIG. 24, latch 2002 comprises upper latching plate horizontal surface (horizontal surface) 2406 and upper latching plate sloping surface (sloping surface) 2408, and latch 2102 comprises upper latching plate horizontal surface (horizontal surface) 2410 and upper latching plate sloping surface (sloping surface) 2412 according to aspects of the embodiments. Sloping surfaces 2408, 2412 need not be linear sloping surfaces (as in a triangle shape, or even the same type of surfaces); they can be curved in some manner, as long as they can slidingly interface with the edge of hole 2416 of horizontal/flat surface 2114 of mounting bracket 104. The sliding engagement between sloping surfaces 2408, 2412 and wall 310 of mounting bracket 104 is shown in FIG. 25.

Figure 25:
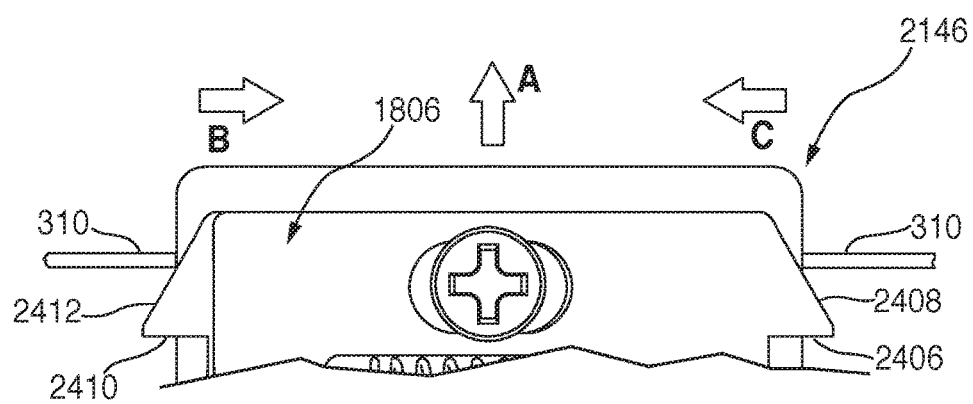

As shown in FIG. 25, SLM 1800 is moving in the direction of arrow C, such that sloping surfaces 2408, 2412 are engaged in a sliding manner with the walls 310 of mounting bracket 104 through hole 2416. In this manner, the sliding motion forward provides a counter-force to spring 1802, compressing it as ULP 1806 moves in the direction of arrow C, and LLP 1808 moves in the direction of arrow B.

Figure 26:
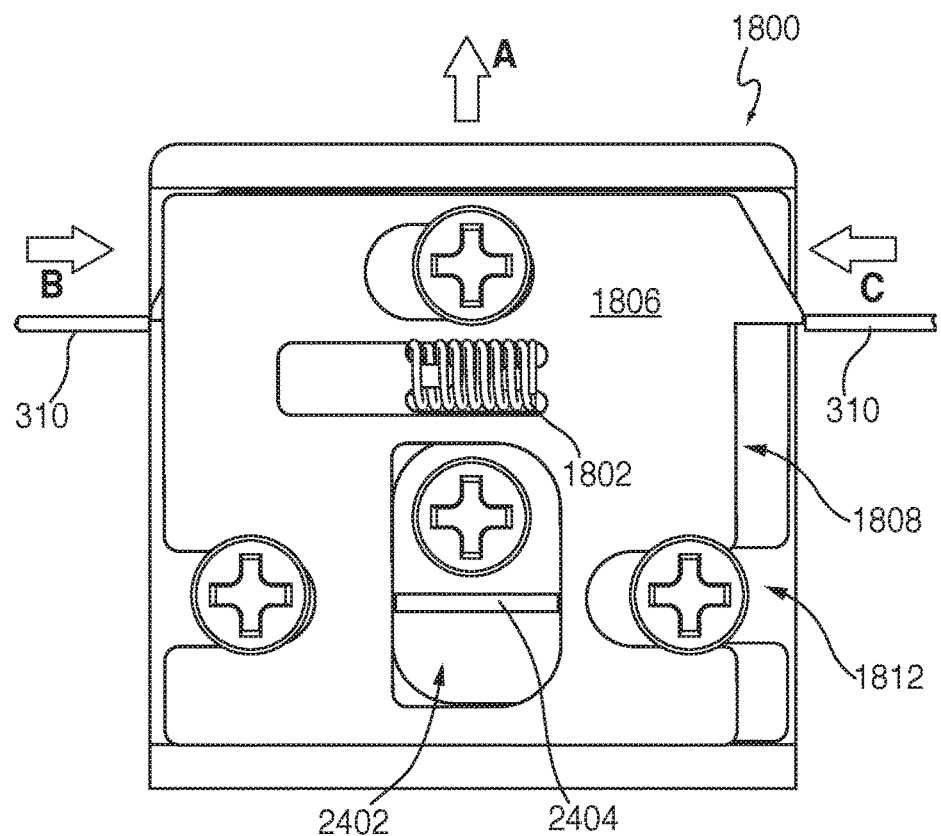

Referring now to FIG. 26, wall 310 of mounting bracket 104 has now pushed ULP 1806 as far left as it can go, and LLP 1808 as far right as it can go. At this point, spring 1802 has been compressed as much as it can be compressed when SLM 1800 is operated according to aspects of the embodiments. Note that latch 2102 and the left most portion of LLP 1808 has all but disappeared behind ULP 1806, as only the very tip of latch 2102 is shown engaged with wall 2417 of mounting bracket 104.

Figure 27:
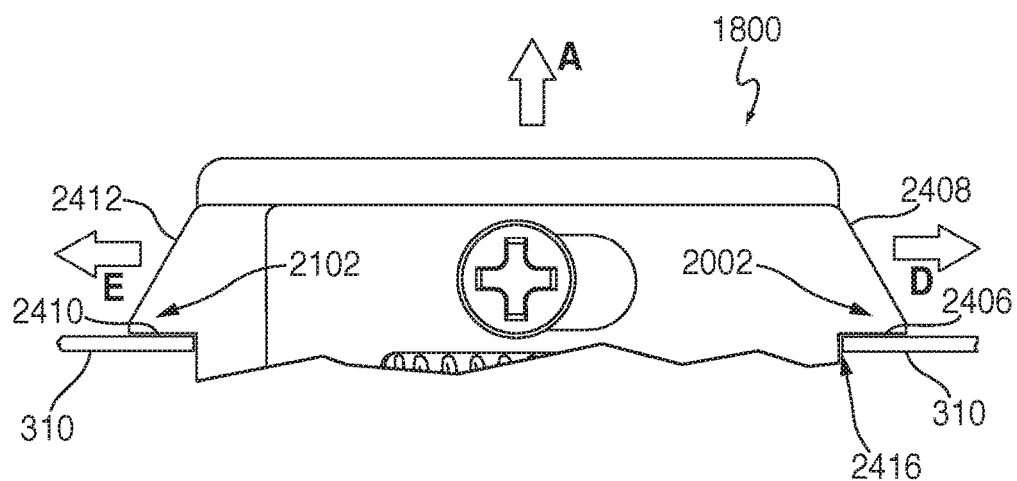

In FIG. 27, SLM 1800 has continued to be moved in the direction of arrow A, such that latches 2002 and 2102 have now moved past wall 310 and can no longer be contained by it. Once the very tips of latches 2002, 2102 have moved past wall 310, there is no longer any restraint or counter-force to spring 1802, which has been compressed as much as it can be by wall 310. As such, spring 1802 is released, and ULP 1806 and LLP 1808 are freed to move in the direction of arrows D and E, respectively, to their outermost positions, as their condition was prior to insertion. FIG. 27 shows horizontal surfaces 2406, 2410 adjacent to wall 310, which can be experienced just after expansion of spring 1802, or when TSD 102, to which SLM 1800 has been attached, is being retracted from mounting bracket 104; such extraction is discussed in greater detail in regard to FIGS. 28-30.

In assembly, both ULP 1806 and LLP 1808 are maintained in place by first and second channel walls 2202, 2204, which are substantially parallel, and dimensioned in height to provide a channel that has a height (or depth) about the same as the combined thicknesses of both ULP 1806 and LLP 1808. Latch screw 1804a-c maintains ULP 1806 and LLP 1808 retained to BP 1812, but is not restrictive in preventing side-to-side movement of ULP 1806 and LLP 1808. Such side-to-side motion is facilitated by first sliding opening 2006 and second sliding opening 2106, which move about screw 1804a as ULP 1806 and LLP 1808 move from side-to-side. Screws 1804b-c and first and second screw slots 2004, 2010 of ULP 1806, and first and second screw slots 2104, 2110 of LLP 1808 operate in a substantially similar manner as screw 1804a and first and second openings 2006, 2106 according to aspects of the embodiments. In FIG. 24, SLM 1800 is shown being inserted into hole 2406 of wall 310 of mounting bracket 104 in the direction of arrow A. Hole 2406 and SLM 1800 are sized such that a width of hole 2406 is just larger than the width of SLM 1800, as those of skill in the art can appreciate, but provides a latching mechanism for latches 2002, 2102 meaning that the width of hole 2406 is less than the outermost distance from latch 2002 to 2102.

Attention is now directed towards FIGS. 24 and 31. In FIG. 24 there is shown de-latching aperture(aperture) 2402. Aperture 2402 is formed by the combination of upper plate retraction aperture (aperture) 2008 and lower plate retraction aperture (aperture) 2108. The two apertures 2008, 2108 overlap, forming aperture 2402, into which a suitably sized slot screwdriver or a similarly shaped tool can be inserted to retract SLM 1800. Retraction occurs when tool 2404 (a de-latching device, typically a slot-headed screwdriver, but not necessarily) is inserted into aperture 2402 and rotated either clockwise (CW) or counterclockwise (CCW), to the position shown in FIG. 31. When rotation of tool 2404 occurs, and if tool 2404 is of sufficient size—ULP 1806 and LLP 1808 will retract such that both of latches 2002, 2102 are pulled in (in the direction of arrows G and H) and SLM 1800 can be retracted through hole 2406 in wall 310 in the direction of arrow F according to aspects of the embodiments. As shown in FIG. 31, ULP 1806 moves in the direction of arrow H, and LLP 1808 moves in the direction of arrow G. LLP 1808 moves under ULP 1806 such that latch 2102 is under ULP 1806. Now SLM 1800 can move in the direction of arrow F through hole 2416 in wall 310 of mounting bracket 104.

FIGS. 28-30 illustrate a series of top views of SLM 1800 shown in FIGS. 18 and 19, among other Figures, when SLM 1800 is attached to circuitry closure 304 of TSD 102, as SLM 1800 progresses from an unlatched condition to a latched condition according to aspects of the embodiments.

FIG. 28 illustrates a top view of an assembly comprising SLM 1800, mounting bracket 104, and TSD 102 as shown in FIG. 1, just prior to latching SLM 1800 to mounting bracket 104, with SLM 1800 removably attached to TSD 102 according to aspects of the embodiments. Securing screw 1810 secures SLM 1800 to TSD 102; mounting bracket 104, which in use is attached to junction box 106 inside a wall (typically), is shown, for purposes of this discussion, not attached to any junction box 106. Mounting bracket 104 is sized to fit substantially closely about circuity enclosure 304 as described supra.

FIG. 29 illustrates a top view of the assembly of FIG. 28 as latching is occurring according to aspects of the embodiments. In FIG. 29, the combined assembly of TSD 102 and SLM 1800 are being inserted into hole 2406 of mounting bracket 104. As described supra, the action of pushing or inserting SLM 1800 into hole 2416 causes ULP 1806 and LLP 1808 to move against the force of spring 1802—the motion of ULP 1806 and LLP 1808 is facilitated in part by sloped surfaces 2408, 2412, of latches 2002, 2102, as it engages the sides of hole 2406 in wall 310 of mounting bracket 104.

FIG. 30 illustrates a top view of the assembly of FIG. 28 just after latching has occurred according to aspects of the embodiments. In FIG. 30, SLM 1800 is latched to mounting bracket 104 as ULP 1806 and LLP 1808 have moved outwardly as spring 1802 pushes them following the passage of latches 2002 and 2102 past wall 310 of mounting bracket 104 according to aspects of the embodiments. Horizontal surfaces 2406, 2410 of latches 2002, 2102 become engaged with wall 310, substantially prevent inadvertent/malicious removal of TSD 102 from mounting bracket 104. According to further aspects of the embodiments, guide 3002 can be implemented on TSD 102 to facilitate location of de-latching tool 2404. Guide 3002 can be a visual only device—for example, a brightly colored line, or it can be a notch in TSD 102, or a combination of a physical object and visual guide such as a line or marking of some type.

INDUSTRIAL APPLICABILITY

To solve the aforementioned problems, the aspects of the embodiments are directed towards systems, methods, and modes for a touch screen control device that has integrated within it one or more speakers, but yet which maintains a substantially thin mounting profile.

The disclosed embodiments provide for a touch screen control device with integrated speakers and a substantially thin mounting profile. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A security latching mechanism attached to a first device for removably securing the first device to a second device, comprising:
    an upper latching plate;
    a lower latching plate; and
    a base plate adapted to retain the upper latching plate and the lower latching in a sliding cooperative engagement with respect to each other and the base plate, and wherein
        each of the upper and lower latching plates further comprise a latch portion adapted to cause a sliding movement for its respective latching plate from a first position to a second position when the respective latching portions are in sliding contact with a security latching mechanism receptacle in the second device, such that
        the security latching mechanism can pass through the security latching mechanism receptacle when the second position has been reached by each of the upper and lower latching plate, and
        upon passing through the security latching mechanism receptacle, each of the upper latching plate and lower latching plate returns to the first position.

2. The security latching mechanism according to claim 1, wherein the latches comprise:
    a triangular shaped portion of respective upper and lower latching plates,
        the triangular shaped portion comprising a linearly sloped surface and a horizontal surface, and wherein each of the linearly sloped surfaces engages in a sliding manner with the security latching mechanism receptacle to cause movement of its respective upper and lower latching plate from the first position to the second position, and further wherein when the second position is reached, each respective horizontal surface contacts a surface of the security latching mechanism receptacle to latch the security latching mechanism and the first device to the second device.

3. The security latching mechanism according to claim 1, wherein the latch comprises:

an irregular shaped portion of respective upper and lower latching plates, the irregular shaped portion comprising a non-linearly sloped surface and a horizontal surface, and wherein each of the non-linearly sloped surfaces engages in a sliding manner with the security latching mechanism receptacle to cause movement of its respective upper and lower latching plate from the first position to the second position, and further wherein when the second position is reached, each respective horizontal surface contacts a surface of the security latching mechanism receptacle to latch the security latching mechanism and the first device to the second device.

4. The security latching mechanism according to claim 1, further comprising:

a de-latching mechanism adapted to temporarily return the upper and lower latching plates from the first position to the second position such that the security latching mechanism can be retracted through the security latching mechanism receptacle.

5. The security latching mechanism according to claim 4, wherein the de-latching mechanism comprises:

a slot shaped aperture formed when a first aperture in the upper latching plate overlaps a second aperture in the lower latching plate.

6. The security latching mechanism according to claim 4, wherein the first aperture in the upper latching plate is a "D" shaped aperture, and the second aperture in the lower latching pate is a horizontally flipped "D" shaped aperture, such that when the first aperture is located on top of the second aperture, the slot shaped aperture is formed by the intersection of the "D" shape and the horizontally flipped "D" shape.

7. The security latching mechanism according to claim 4, wherein the de-latching aperture is adapted to be operated by inserting a slot shaped tool therein, and rotating the slot shaped tool by about 90° to cause each of the upper latching plate and the lower latching plate to slide from the first position to the second position.

8. The security latching mechanism according to claim 1, further comprising;

a first position restoration assembly adapted to return each of the upper latching plate and lower latching plate returns to the first position upon passage of the security latching mechanism through the security latching mechanism receptacle.

9. The security latching mechanism according to claim 8, wherein the first position restoration assembly comprises:

a spring;

a first aperture in the base plate;

a second aperture in the lower latching plate, the second aperture comprising a first spring retention pin at a first end of the second aperture; and a third aperture in the upper latching plate, the third aperture comprising a second spring retention pin at a second end of the third aperture, and wherein the first, second, and third apertures are substantially similarly shaped as elongated ovals, and are substantially similar in size, and are substantially aligned with each other, such that the spring can fit within the first, second, and third apertures, and further wherein the first and second spring retention pins, located opposite each other, retain the spring within the first, second, and third apertures, and still further wherein, the size of the first, second, and third apertures, and the size and spring constant of the spring, are such that the upper and lower latching plates are pushed apart from each other by the normally compressed spring.

10. The security latching mechanism according to claim 9, further comprising:

a securing screw adapted to be retained and usable by the security latching mechanism through interaction of the upper latching plate, the lower latching plate and the spring, and wherein the securing screw is adapted to secure the security latching mechanism to the first device.

11. The security latching mechanism according to claim 1, wherein the security latching mechanism can be pre-assembled prior to installation onto the first device, and retain being assembled following removal from the first device.

* * * * *